US009894179B2

(12) United States Patent
Sun et al.

(10) Patent No.: US 9,894,179 B2
(45) Date of Patent: Feb. 13, 2018

(54) ELECTRONIC DEVICE AND COORDINATION DEVICE AND METHOD FOR IMPLEMENTING COORDINATED TRANSMISSION BETWEEN THE SAME

(71) Applicant: SONY CORPORATION, Minato-ku (JP)

(72) Inventors: Chen Sun, Beijing (CN); Xin Guo, Beijing (CN); Yuxin Wei, Beijing (CN); Zhongbin Qin, Beijing (CN)

(73) Assignee: SONY CORPORATION, Tokyo (JP)

( * ) Notice: Subject to any disclaimer, the term of this patent is extended or adjusted under 35 U.S.C. 154(b) by 576 days.

(21) Appl. No.: 14/558,000

(22) Filed: Dec. 2, 2014

(65) Prior Publication Data
US 2015/0189042 A1 Jul. 2, 2015

(30) Foreign Application Priority Data
Dec. 26, 2013 (CN) .......................... 2013 1 0740103

(51) Int. Cl.
G06F 15/177 (2006.01)
H04L 29/08 (2006.01)
(Continued)

(52) U.S. Cl.
CPC .............. *H04L 67/32* (2013.01); *H04L 67/10* (2013.01); *H04W 76/023* (2013.01);
(Continued)

(58) Field of Classification Search
CPC ................... H04L 29/08306–29/08351; H04L 67/104–67/1051; H04L 67/6077;
(Continued)

(56) References Cited

U.S. PATENT DOCUMENTS 7,301,924 B1* 11/2007 Gurbuz ................ H04B 7/0689
370/335
2005/0117530 A1* 6/2005 Abraham .......... H04W 52/0232
370/310
(Continued)

FOREIGN PATENT DOCUMENTS

WO WO 2011/019501 A1 2/2011

OTHER PUBLICATIONS

Extended European Search Report dated Oct. 5, 2015 in Patent Application No. 14199109.1.
(Continued)

*Primary Examiner* — Brendan Higa
(74) *Attorney, Agent, or Firm* — Oblon, McClelland, Maier & Neustadt, L.L.P.

(57) ABSTRACT

The invention discloses an electronic device and a method and device for implementing coordinated transmission between electronic devices. The electronic device comprises a coordination establishment module configured to send a coordination request signal to candidate coordination devices as well as determine coordination devices in accordance with a response of the candidate coordination device and establish coordination connection with the determined coordination device, and a data transmission module configured to transmit target data by a plurality of communication links, the plurality of communication links comprising communication links between the electronic device and the coordination device. The present invention can establish the coordination connection reasonably by initiating the coordination through the request and transmitting the data through the plurality of communication links by the coordination device, thereby effectively improving the data transmission speed through the plurality of the communication links.

19 Claims, 14 Drawing Sheets

(51) Int. Cl.
*H04W 76/02* (2009.01)
*H04W 28/08* (2009.01)
*H04L 12/803* (2013.01)

(52) U.S. Cl.
CPC ......... *H04W 76/025* (2013.01); *H04L 47/125* (2013.01); *H04W 28/08* (2013.01)

(58) Field of Classification Search
CPC ....... H04L 69/24; H04W 88/06–88/12; H04W 92/00–92/06; H04W 92/10–92/14; H04W 76/025–76/028
See application file for complete search history.

(56) References Cited

U.S. PATENT DOCUMENTS

| | | | |
|---|---|---|---|
| 2005/0221858 A1* | 10/2005 | Hoddie | H04W 28/16 455/557 |
| 2008/0165727 A1* | 7/2008 | Xiaoben | H04W 16/04 370/329 |
| 2009/0097451 A1* | 4/2009 | Gogic | H04W 36/30 370/331 |
| 2010/0303051 A1* | 12/2010 | Umeuchi | H04W 48/16 370/338 |
| 2011/0040888 A1 | 2/2011 | Krishnaswamy et al. | |
| 2011/0165873 A1* | 7/2011 | Gidvani | H04W 24/10 455/434 |
| 2013/0060653 A1* | 3/2013 | Sharkey | H04L 69/321 705/26.3 |
| 2013/0258897 A1* | 10/2013 | Park | H04B 7/0626 370/252 |
| 2014/0126530 A1* | 5/2014 | Siomina | H04W 52/146 370/330 |
| 2015/0154546 A1* | 6/2015 | Skaaksrud | H04W 12/06 705/333 |

OTHER PUBLICATIONS

Kiran Vanganuru et al., "System Capacity and Coverage of a Cellular Network with D2D Mobile Relays", Military Communications Conference, XP-032315471, Oct. 29, 2012, 6 pages.

* cited by examiner

| Repeat at three periods until a source device finishes transmission required for an application | | | | | | |
|---|---|---|---|---|---|---|
| Coordination User Group Setting Period (including searching of coordination users and transmission setting) T0 | External network transmission period T1 | Internal network transmission period T2 | Coordination User Group Setting Period (including searching of coordination users and transmission setting) T0 | External network transmission period T1 | Internal network transmission period T2 | ...... |

FIG. 8

| | | | | |
|---|---|---|---|---|
| | T1 period for a source device | T2 period for a source device | | |
| | T1 period for coordination device 1 | T2 period for coordination device 1 | | |
| T0 | T1 period for coordination device 2 | | T2 period for coordination device 2 | |
| | T1 period for coordination device 3 | | | T2 period for coordination device 3 |

FIG. 9

ELECTRONIC DEVICE AND COORDINATION DEVICE AND METHOD FOR IMPLEMENTING COORDINATED TRANSMISSION BETWEEN THE SAME

FIELD OF THE INVENTION

The present invention relates to the communication field and more particularly to an electronic device, a coordination device and a method for implementing coordinated transmission between the same.

BACKGROUND OF THE INVENTION

The mobile internet is popularized increasingly due to continuous development of wireless communication systems. More and more users surf the internet through cellular network. For example, GPRS network or other various networks provided by operators can provide data communication for surfing at electronic devices and also may provide GSM network to support voice communications for users.

At present, the cellular network provided for the users fails to support high-speed data communication. Although the cellular network in the future has higher-speed data communication, the speed required by applications of the users will be higher than the speed for providing the data communication. The users can update the network traffics, which can improve the total data traffics only but not change the network speed (failure to accelerate the speed of data transmission).

In the internet field, applications capable of being downloaded in a shared manner have been emerging, such as BT which can promote users' downloading speed through coordination between network users. The principle of BT is to download resources which have not been owned by users by monitoring resources which have been exited for other users. The coordination is opportunistic because the users are commonly interested in a network resource to be downloaded. Moreover, the users download the network resources spontaneously without the coordination therebetween, which, hence, will result in repeatedly downloading the resources.

Downloading modes such as BT and other modes dedicated for the internet field are not applicable to wireless network experiencing more restrictions in the network speed and traffic.

The data uploading cannot be implemented efficiently due to various limitations except that the data downloading experiences the network limitations. More specifically, the existing electronic device stores data in a local memory or stores data in a network hard disk in a networking state. However, the current applications will be limited by the network speed due to a centralized data uploading manner, and it not advantageous for device equipment to upload and store the data to empty the storage space timely. If the storage space is not sufficient and the current device is not networked or the speed of the external network is low, the users cannot upload the data in time, which, hence, will result in failure to operate a new application.

At present, there is still no solution on how to implement the coordinated transmission between devices in wireless communication network to improve equivalent speed of data transmission.

DESCRIPTION OF THE INVENTION

As for the problem of low data transmission speed in the wireless communication network with no reasonable coordination solution, the present invention provides an electronic device, a coordination device and a method for implementing coordinated transmission between the same, which can implement coordinated transmission among a plurality of electronic devices reasonably so as to improve the data transmission speed.

In order to achieve the above object, an electronic device is provided according to embodiments of the present invention.

The electronic device includes a coordination establishment module configured to send a coordination request signal to at least one candidate coordination devices as well as determine at least one coordination device in accordance with the responses of the candidate coordination devices and establish a coordination connection with the determined coordination device; and a data transmission module configured to communicate for target data through a plurality of communication links, the plurality of communication links comprising communication links between the electronic device and the coordination device.

According to embodiments of the present invention, a coordination device is provided, which is used as a coordination device to assist a source device in data transmission, including a coordination establishment module configured to receive the coordination request signal from the electronic device and send a coordination response to the device to establish the coordination, and a data transmission module configured to transmit corresponding data according to a data transmission task received for assisting transmission of the device.

According to the embodiments of the present invention, a method for implementing coordinated transmission between electronic devices is provided.

The method comprises the steps of sending a coordination request signal to at least one coordination devices as well as determining a coordination device in accordance with responses of the candidate coordination devices and establishing coordination connection with the determined coordination device, and communicating for target data through a plurality of communication links, the plurality of communication links comprising communication links between the electronic device and the coordination device.

According to the embodiments of the present invention, a method for implementing coordinated transmission between electronic devices is also provided, comprising the steps of receiving the coordination request signal sent by the electronic device and sending a coordination response to the electronic device so as to establish coordination connection, and transmitting corresponding data based on a data transmission task received for assisting transmission of the electronic device.

According to the embodiments of the present invention, a coordination control device is further provided.

The coordination control device comprises a communication module configured to receive a coordinated transmission control request containing device parameter information sent by the electronic device; and a determination module configured to determine transmission parameters for coordinated transmission performed by the electronic device and each coordination device in accordance with the coordinated transmission control request.

A coordination control method is also provided according to the embodiments of the present invention.

The coordination control method comprises the steps of receiving a coordinated transmission control request containing device parameter information sent by the electronic device, and determining transmission parameters for coordinated transmission performed by the electronic device and each coordination device in accordance with the coordinated transmission control request.

The present invention can establish the coordination connection reasonably by initiating the coordination through the request and transmitting the data through the plurality of communication links by the coordination device, thereby effectively improving the data transmission speed through the plurality of the communication links.

BRIEF DESCRIPTION OF THE DRAWINGS

The following detailed description to figures in the embodiments is made to illustrate the embodiments of the present invention or the technical solution in the prior art clearly. Obviously, the following figures are some embodiments of the present invention merely. Those skilled in the art may achieve other figures without creative works according to the figures.

FIG. 8 is a diagram of a device transmission sequence in a coordinated transmission implementation solution according to the present invention.

FIG. 9 is a diagram of coordinated transmission among a plurality of devices under single-mode transmission condition in a coordinated transmission implementation solution according to the present invention.

DETAILED DESCRIPTION OF ILLUSTRATIVE EMBODIMENTS

The following description for the illustrative embodiments of the present invention is made in conjunction with the figures. Features of the actual embodiments are not described completely in the description for clarity and conciseness. It should be appreciated, however, that many decisions special to the embodiments must be made during the development of such actual embodiments in order to realize the specific goals of the developers, for example, these decisions include restriction conditions related to systems and services, which may be changed as the embodiments are altered. In addition, it should be recognized that the development work may be complicated and time-consuming, but it is a routine task for those skilled in the art beneficial from the disclosure.

It is noted that device structures and/or processing steps related to the solution of the invention are illustrated merely in the figures in order to focus on the invention.

In related prior arts, many electronic devices implement data communication through the cellular network with a fixed bandwidth. Such data communication speed is always fixed regardless of the traffics these devices have purchased, and thus the improvement of user experiences cannot be achieved by increasing the traffics; and meanwhile, the coordinated transmission in the internet field is not applicable to the mobile network. Accordingly, it is difficult to improve the data transmission speed of the mobile network.

The following detailed description to the embodiments of the present invention will be made aiming at the solutions of the present invention.

An electronic device is provided according to the embodiments of the present invention.

Figure 1:
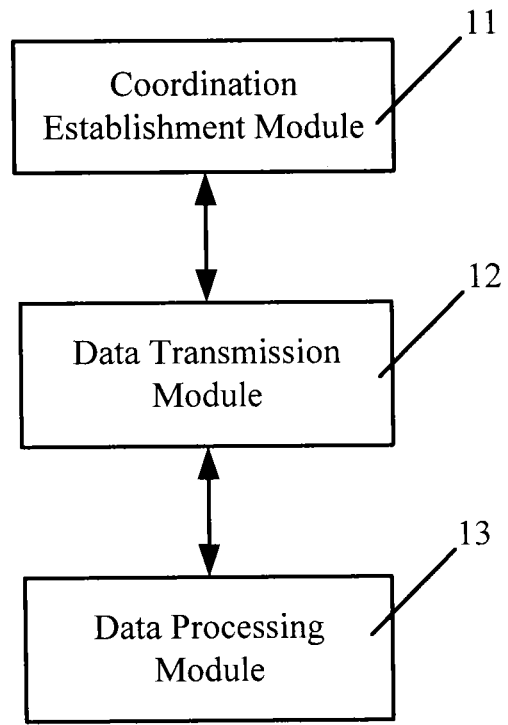
FIG. 1 is a block diagram of an electronic device in accordance with embodiments of the present invention.

FIG. 1 illustrates an electronic device according to the embodiments of the present invention, comprising a coordination establishment module 11 configured to send a coordination request signal to at least one candidate coordination device as well as determine at least one coordination device in accordance with responses of the candidate coordination devices and establish coordination connection with the determined coordination device; and a data transmission module 12 configured to communicate for target data through a plurality of communication links, the plurality of communication links comprising communication links between the electronic device and the coordination device.

Furthermore, the electronic device further comprises a data processing module 13 configured to combine data received by the plurality of communication links to facilitate to download the target data, and/or configured to split the target data to partition the target data to facilitate to upload the target data by the data transmission module through the plurality of communication links.

In addition, the data processing module 13 is also configured to split the target data during the target data uploading so that the data transmission module 12 uploads the split target data through the plurality of communication links.

The device, referred to as the source device, may implement transmit the target data coordinately with one or a plurality of other electronic devices used as the coordination devices. The plurality of communication links may comprise links between the source device and a base station/router, and links between the source device and the coordination device. If direct communication with the external network (for example, the source device may be the electronic device for which the cellular network is not available) is not available for the source device, the plurality of communication links comprise links between the source device and a plurality of coordination devices.

In one embodiment, after the determination of the coordination device, the coordination establishment module 11 is further configured to send device parameter information to an external coordination control device and receive a candidate coordination device instruction determined by the external coordination control device in accordance with the device parameter information so as to determine the candidate coordination device as well as send information of the coordination device determined finally to the external coordination control device, the device parameter information comprising a position of the electronic device and/or information related to the target data (for example, attributes of the target data such as size and the like). At the moment, the external coordination control device may determine the candidate coordination device in accordance with the position of the source device in the device parameter information, and inform the candidate coordination device of the information related to the target information. The candidate coordination device may send a message whether it implements the coordinated transmission to the external coordination control device which determines a final coordination device in accordance with feedbacks of the candidate coordination devices and sends the information on the coordination device to the source device.

In another embodiment, the coordination establishment module 11 of the source device may send the device parameter information (including a position of the electronic device and the information related to the target data (for example, attributes of the target data such as size and the like)) to the external coordination control device, and receives instructions of the candidate coordination devices determined by the external coordination control device in accordance with the device parameter information as well as sends the information of the coordination device determined finally to the external coordination device, the device parameter information comprising the position of the electronic device and the information on the target data.

In addition, the coordination establishment module 11 is further used to directly search the candidate coordination devices by, for example, sending beacon, and the candidate coordination devices may be devices in proximity to the coordination establishment module 11.

Candidate coordinators are several specific devices, the source device may send a request to these devices and finally determine the coordination device in accordance with the responses of these devices in a situation that a network device (for example, the external coordination control device) screens the coordination devices, or in a situation that the coordination devices are specified by human.

The following detailed descriptions to functions of each module during the data transmission will be made.

In one embodiment, the device parameter information also comprises at least one of an external network speed of data transmission between the electronic device and the external communication network containing infrastructures, internal network speed of the data transmission between the electronic device and the coordination device, and mode information whether multi-band simultaneous transmission is available, and the data transmission module 12 is also configured to receive the transmission parameters from the external coordination control device and transmit the data in accordance with the transmission parameters, wherein the transmission parameters are determined by the external coordination control device in accordance with the device parameter information, and the transmission parameters comprises transmission task information on a portion corresponding to the target data carried by the electronic device. For example, in this embodiment, the transmission parameters of each device may be determined by the external coordination control device and are notified to the electronic device.

Additionally in another embodiment, the electronic device is used to determine transmission parameters corresponding to each coordination device and meanwhile the data processing module 13 is configured to determine the transmission parameters during the coordinated transmission between the source device and each coordination device and inform the corresponding coordination device of the transmission parameters, the transmission parameters corresponding to each coordination device include transmission task information on a portion corresponding to the target data carried by the coordination device.

In order to reasonably determine which portion of data and how much data are required for each coordination device to transmit, a response of the candidate coordination device may comprise an external network speed of the data transmission between the candidate coordination device and the external communication network containing the infrastructures.

At the moment, the data processing module 13 may determine a transmission task of each device involved in the coordinated transmission according to the external network speeds of the data transmissions between the source device and the external communication network including the infrastructures as well as between the coordination device and the external communication network including the infrastructures, and an internal network speed of the data transmission between the source device and the coordination device (the internal network speed may be determined at the coordination establishment). The transmission task of each device is determined based on the principle that the overall transmission speed of the target data is maximized by the source device through the plurality of communication links according to the internal network speed and the external network speeds. For example, transmission tasks with the larger amount of data may be allocated to coordination devices with the higher external network speed, and transmission tasks with the smaller amount of data may be allocated to coordination devices with the lower external network speed, so that the earlier completion of the transmission tasks for the coordination devices with the higher external network speed than the coordination devices with the lower external network speed can be avoided. Furthermore, the internal network speed is generally higher than the coordination devices with the higher external network speed, so the internal network speed may be regardless in the practical applications. As such, the similar mode may be applicable to the situation that the external coordination control device determines the transmission parameters.

Moreover, transmission modes available for different devices are different, for example, multi-mode transmission (the multi-band simultaneous transmission is available) is available for some devices, and single-mode transmission (the multi-band simultaneous transmission is not available)

is merely available for other devices. The devices for which the single-mode transmission is available cannot transmit the data through the internal network at the same time of transmitting the data through the external network; and the devices for which the multi-mode transmission is available are not such limited. Therefore, the data processing module 13 is also configured to determine the timing sequence of each device involved in the coordinated transmission by combining a condition whether the multi-band simultaneous transmission is available for the source device and the coordination device and carry the timing sequence in the transmission parameters to inform the corresponding coordination devices in a situation that the source device and/or the coordination device is the single-mode device in order to more exactly split the tasks to improve the data transmission efficiency. The transmission task is allocated to the coordination device according to the transmission mode available for each coordination device, thereby further optimizing the data transmission and reasonably utilizing the transmission resources of the coordination device. As such, the similar mode is also applicable to the situation that the coordination control device determines the transmission parameters so as to optimize the data transmission.

The embodiments described are applicable to the data uploading, such as real-time data uploading and non-real-time data uploading, except the data downloading.

Additionally, when the coordination device assists the source device in non-real-time data uploading, the responses of the candidate coordination devices may include the available storage space of the candidate coordination device and the internal network speed of the data transmission between the candidate coordination device and the electronic device in the non-real-time data uploading embodiments because the coordination device will receive data from the source device and the coordination device which is networked will upload the data from the source device. After receiving the data from the source device required to be uploaded, the coordination device is networking at the higher speed and then uploads the data from the source device, and thus the non-real-time data uploading is performed regardless of the information on the speed of the data transmission between the coordination device and the external network and whether the coordination device is the single-mode device or the multi-mode device. Accordingly, the information may not be transmitted in the response.

Besides, the data processing module 13 is also configured to delete the target data/a part of the split target data which is uploaded successfully in a situation that the target data is uploaded. As such, the coordination device assisting the source device in uploading the data may also delete the data which is uploaded completely. Also, the data processing module 13 is further configured to split the target data required to be uploaded in accordance with the internal network speed between the candidate coordination device and the electronic device and/or memory space of the coordination device for data transmission.

Therefore, when the source device is required to transmit the stored data to a network device and the network device is offline at one time, it may keep connection with peripheral equipment for data transmission through near field communication (for example, infrared, WiFi, Bluetooth and the like). Thus, the data at the source device may be stored in the peripheral equipment (the coordination device) temporarily, and then the peripheral equipment which is networked will send the stored data to the network device. Alternatively, the data which is sent to the peripheral equipment by the source device is uploaded in real time by the peripheral equipment so that the device can clean up the storage space timely available for application software.

In addition, in the embodiments described and non-described in which the data is uploaded or downloaded, the data received by the data transmission module 12 through the plurality of communication links and the data split by the data processing module 13 have identifications which are used for combine the data to obtain the target data.

Before the determination of the coordination device, when the candidate coordination devices respond to the coordination request signal from the source device, the candidate coordination devices may send the information including at least one of the mode information representing whether the multi-band simultaneous transmission is available for the candidate coordination device, a geographic position, a motion range, a motion speed, available electric quantity and available data traffic to the source device by the response for the purpose of the subsequent determination of the coordination device and the determination of the transmission task for each coordination device.

According to the information contained in the response, the coordination establishment module 11 may preferentially determine the candidate coordination devices in positional proximity to the source device and having slow motion speed, narrow motion range, much available electric quantity and/or large amount of available data traffic as the coordination device, and the data processing module 13 is used to determine a transmission tasks of a portion corresponding to the target data carried by the coordination device according to the geographic position, the motion range, the motion speed, the available electric quantity and/or the available data traffic.

The available electric quantity/available traffic may be remaining electric quantity/remaining data traffic, or electric quantity/data traffic used by the candidate coordination devices for the coordinated transmission. In addition, the source device and the devices having the slow motion speed and/or narrow motion range are determined as the coordination devices preferentially so as to ensure the coordination devices assisting the source device in transmission to be stable as much as possible, because once the number of the coordination devices changes, it is necessary to determine the transmission tasks of the current coordination devices (and the source device) again.

In addition, the data processing module 13 may allocate the transmission tasks to the coordination devices by many allocation operations, wherein each allocation operation is based on a part of the data not transmitted in the target data and ordered in front of other data.

Take data downloading as an example, hypothetically, the target data required to be downloaded is X in the form of a media file, so that the target data X may be split into data A, data B and data C (the target data may be split equally or non-equally). In the target data X, the data A is sorted firstly and the data C is sorted lastly. Tasks nay be allocated to the three devices based on the data A at first; after completion of downloading the data A, the next task allocation is performed, that is, the data B is allocated to the three devices; and finally the allocation is based on the data C. In another embodiment, similarly, downloading the target data X at the three devices can be achieved by the following steps: splitting the target data into data A1 and data A2, wherein the data A1 is ordered in front of other data and the space occupied by the data A1 may be smaller than that of the data A2; and allocating the tasks to the three devices based on the data A1 at the first task allocation, splitting the data A2 to obtain the data B1 and B2 after the completion of downloading the data A1, and allocating the tasks based on the data B1 ordered in front of other data. In the examples described above, the data A, the data A1, the data B, the data C and the data B1 may be sized fixedly in advance and depend on the size of the target data and the like.

In order to avoid the problem that factors such as the motion of the devices and the like will result in failure of a part of the coordination devices to further assist the source device in transmitting the target data, the electronic device according to the present invention may further include a detection module configured to detect whether the coordination devices change at a predetermined period, wherein the coordination establishment module 11 detects determines the coordination device again if detecting the changes occurring to the coordination devices, and the data processing module 12 allocates the transmission tasks to the current coordination devices again based on the data not transmitted in the target data.

Furthermore, alternatively, when tasks of devices corresponding to the plurality of communication links are determined, the amount of the data carried by each device corresponding to each communication link is determined in accordance with the proportion among the equivalent transmission speeds of the plurality of communication links. More specifically, the proportion of the target data carried by one link for transmission can be determined by the ratio of speeds of the link to other links. For example, when there are N (N is more than or equal to 3) communication links, the data processing module is also configured to make the first to the $(N-1)^{rd}$ communication links equivalent to one communication link and calculate the equivalent data transmission speed of the one communication link, and the proportion of the target data carried by the $N^{rd}$ communication link for transmission can be determined in accordance with the ratio of the equivalent data transmission speed to the data transmission speed of the $N^{rd}$ communication link.

In another embodiment, an electronic device (the electronic device shown in FIG. 1) according to the present invention is also used as the coordination device providing the coordinated transmission for other devices. Thus, the coordination establishment module 11 of the device is configured to send a coordination response to other electronic device to establish coordination according to a coordination request signal sent by the other electronic device. The data transmission module 13 of the device is configured to transmit the corresponding data in accordance with the data transmission task received for assisting the other electronic device in transmission.

Besides, the coordination device assisting the source device in the data transmission may be functionally identical or similar to the source device. For example, the coordination device may comprise a coordination establishment module and a data transmission module, wherein the coordination establishment module is configured to receive a coordination request signal sent by the source device and send a coordination response to the source device so as to establish the coordination, and the data transmission module is configured to transmit the corresponding data according to the data transmission task received for assisting the device in data transmission.

In addition, according to the embodiments of the present invention a coordination control device is provided (at a network side).

Figure 2:
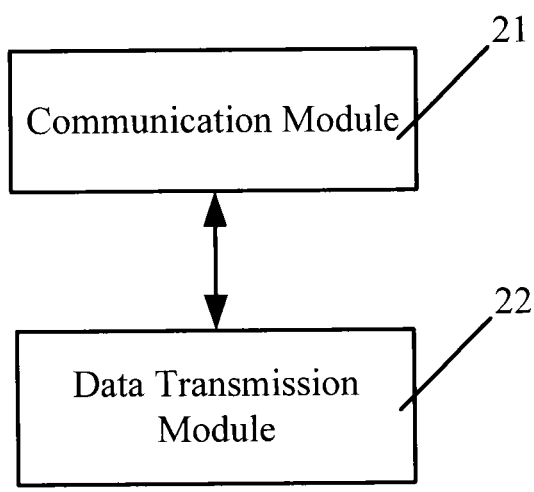
FIG. 2 is a block diagram of a coordination control device in accordance with embodiments of the present invention.

FIG. 2 illustrates a coordination control device according to the embodiments of the present invention, comprising a communication module 21 configured to receive a coordinated transmission control request containing the device parameter information sent by the electronic device, and a determination module 22 configured to determine transmission parameters of the coordinated transmission between the electronic device and each coordination device.

The device parameter information contains a position of the electronic device and information of the target data to be transmitted. The determination module 22 is also configured to determine a candidate coordination device performing coordinated transmission with the electronic device according to the device parameter information, and generate an instruction of the candidate coordination device (used for informing the source device of the factor that which devices are the candidate coordination devices) according to the determined candidate devices. The communication module 21 is configured to send the instruction of the candidate coordination device to the electronic device and receive the information on the coordination device determined finally from the electronic device.

When the coordination device is determined, the determination module 22 may determine the candidate coordination device in accordance with the position of the source device in the device parameter information, and inform the information related to the target data of the candidate coordination device which may send a message whether the candidate coordination device performs the coordinated transmission to an external coordination control device (received by the communication module 21). The determination module 22 determines the final coordination device in accordance with feedbacks of the candidate coordination devices and sends the information on the coordination device to the source device through the communication module 21.

Additionally, when the coordination device is determined, the determination module 22 generates an instruction of the candidate coordination device in accordance with the device parameter information and sends the instruction to the source device through the communication module 21, and then the source device determines the final coordination device by itself, and the communication module 21 receives the information on the coordination device determined finally from the source device.

In addition, the device parameter information contains information related to the target data to be transmitted, external network speeds of the data transmissions between the electronic device and the external communication network including the infrastructures as well as between the coordination device and the external communication network including the infrastructures, an internal network speed of the data transmission between the electronic device and the coordination device, and mode information whether the multi-band simultaneous transmission is available. The communication module 21 is configured to send the transmission parameters to the corresponding device, the transmission parameters include information on a transmission task of a portion corresponding to the target data carried by the device involved in the coordinated transmission.

Besides, the transmission parameters may further include timing sequences of the data transmission between each device and the external network as well as between each device and the internal network. The determination module 22 is configured to determine the timing sequence of each device involved in the coordinated transmission by combining the condition whether the multi-band simultaneous transmission is available for the electronic device and the coordination device.

More specifically, when the transmission task of each device is determined, the determination module 21 determines the transmission task of each device based on the principle that the overall transmission speed of the target data is maximized by the source device through the plurality of communication links according to the internal network speed and the external network speeds. For example, transmission tasks with the larger amount of data may be allocated to the coordination devices with the higher external network speed, and transmission tasks with the smaller amount of data may be allocated to the coordination devices with the lower external network speed, so that the earlier completion of the transmission tasks for the coordination devices with the higher external network speed than the coordination devices with the lower external network speed can be avoided. Furthermore, the internal network speed is generally higher than the coordination devices with the higher external network speed, so the internal network speed may be regardless in the practical applications.

Moreover, transmission modes available for different devices are different, for example, multi-mode transmission (the multi-band simultaneous transmission is available) is available for some devices, and single-mode transmission (the multi-band simultaneous transmission is not available) is merely available for other devices. The devices for which the single-mode transmission is available cannot transmit the data through the internal network at the same time of transmitting the data through the external network; and the devices for which the multi-mode transmission is available are not such limited. Therefore, the determination module 22 is also configured to determine the timing sequence of each device involved in the coordinated transmission by combining a condition whether the multi-band simultaneous transmission is available for the source device and the coordination device and carry the timing sequence in the transmission parameters to inform the corresponding coordination devices in a situation that the source device and/or the coordination device is the single-mode device in order to more exactly split the tasks to improve the data transmission efficiency. The transmission task is allocated to the coordination device according to the transmission mode available for each coordination device, thereby further optimizing the data transmission and reasonably utilizing the transmission resources of the coordination device.

Moreover, For example, when there are N (N is more than or equal to 3) communication links, the data transmission module 22 is also configured to make the first to the $(N-1)^{rd}$ communication links equivalent to one communication link and calculate the equivalent data transmission speed of the one communication link, and the proportion of the target data carried by the $N^{rd}$ communication link for transmission can be determined in accordance with the ratio of the equivalent data transmission speed to the data transmission speed of the $N^{rd}$ communication link.

Besides, alternatively, the device parameter information may include at least one of mode information representing the multi-band simultaneous transmission is available for the candidate coordination devices, a geographic position, motion range, motion speed, available electric quantity and available data traffic.

When the candidate coordination device is selected, the determination module 22 may preferentially determine the candidate coordination device in positional proximity to the source device and having slow motion speed, narrow motion range, much available electric quantity and/or large amount of available data traffic as the coordination device, and also determine a transmission task of a portion corresponding to the target data carried by the coordination device according to the geographic position, the motion range, the motion speed, the available electric quantity and/or the available data traffic of the coordination device.

In addition, the determination module 22 may allocate the transmission tasks to the coordination devices by many allocation operations, wherein each allocation operation is based on a part of the data not transmitted in the target data and ordered in front of other data.

The coordination control device according to the present invention may further include a detection module (not shown) configured to detect whether the coordination device changes at a predetermined period; and the determination module 22 detects the change occurring to the coordination device and then determines the coordination device again, and further allocates the transmission task to the current coordination device again based on the data not transmitted in the target data (splitting the target data not transmitted yet).

In addition, the coordination control device may also comprise a data transmission module for transmitting the target data. Actually, the data transmission module may be arranged with the communication module integrally or independent of the communication module and may be provided at the outside of the coordination control device, such as a data server.

In addition, to ensure the data security, the data transmitted by the coordination device may be uploaded or downloaded in such a manner that it is encrypted and/or disrupted in its order. For example, the data transmitted to the coordination device may be encrypted or disrupted in its order by the network side during the downloading, and the data transmitted to the coordination device may be encrypted and/or disrupted in its order by the source device during the uploading.

It can thus be seen that the present invention relates to a design of the wireless transmission system in the wireless communication, which is an effective solution to the problem how to share traffics so as to increase actual transmission bandwidth under the condition of limited user bandwidth. The solution of the present invention mainly involves architecture of the management system, function modules, information exchange procedures, and optimizations for use of each system frequency spectrum on the premise of ensuring to control inter-system interferences in a limited scope.

The specific applications of the technical solution of the present invention will be described as follows.

System Architecture

Figure 3A:
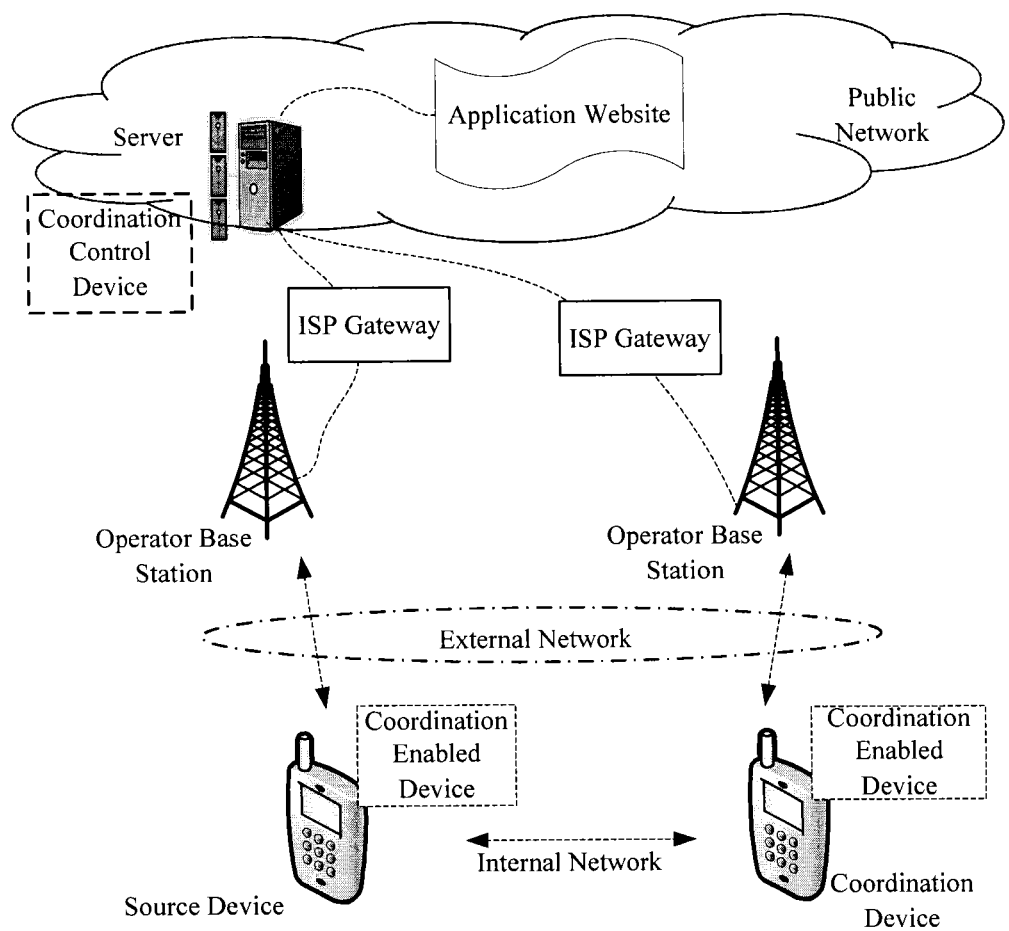
FIG. 3a is a structure diagram of a coordinated transmission implementation system in accordance with one embodiment of the present invention.
Figure 3B:
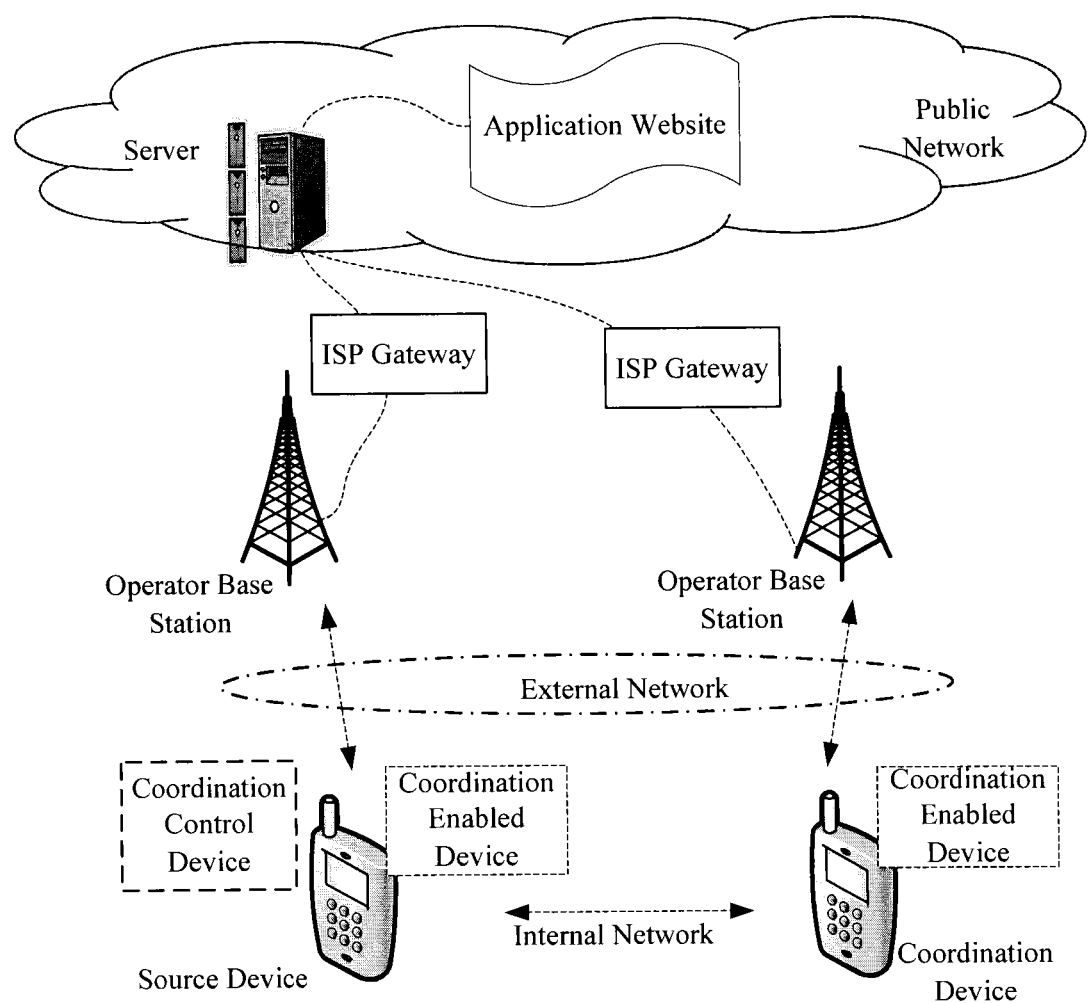
FIG. 3b is a structure diagram of a coordinated transmission implementation system in accordance with another embodiment of the present invention.

As shown in FIGS. 3a and 3b, the system adapted by the present invention may comprise a coordinated transmission server, a coordination control device, a coordination enabled device and operator base stations. The source device and the coordination devices may be communicated by the internal network and communicated with the operator base stations by the external network. In addition, alternatively, the public network at a server side may further comprise an application website.

As shown in FIG. 3a, the coordination control device may be provided at the server (referred to as a coordinated transmission server) which is connected with the public network so as to split and merge the data when a user service is transmitted in and out of the external network. As shown in FIG. 3b, the coordination control device is provided at a user device.

The coordination control device comprises a management module, a storage module and a communication module. The management module may calculate the occupancy of the frequency spectrums of each coordination device (including the frequency spectrums setting the internal network and the frequency spectrums setting the external network). The storage module records traffics used by each device in the coordinated communication. The information exchange module is used to communicate with each device.

The coordination enabled device may comprise a control module, a storage module and an information exchange module. The control module splits and merges the user data and manages user devices including synchronization therebetween and searching of the coordination users. The information exchange module implements information exchange between the user devices as well as between the user device and the coordination control device.

Moreover, to upload the data, the device side may comprise a distribution and transmission control device, which is configured to search the adjacent device equipment and segment the data to be stored according to the quality of the near field communication with the device equipment and then send the segmented data to the adjacent device equipment. The distribution and transmission control device on the auxiliary device calculates the interval time for networking and the time of duration after networking in accordance with historical network connection and disconnection information. On one hand, the information is different based on the different geographic regions. For example, auxiliary device equipment connects to the network every 30 min for 10 min at an average network speed of 1 Mbits/S; on the another hand, the network side may also comprise a control device for receiving the data to be uploaded, and recombines the data received from the device and the equipment adjacent to it in accordance with the logical order of the data (identifications of the data) so as to recover the original data of the user device.

Work Procedure and System Information Interaction Procedure

As shown in FIGS. 3a and 3b, the user device is communicated with the internet through the operator base stations (different operator base stations or the same operator base station) and an ISP gateway. The base stations may be connected by the cellular network or other network, which is referred to as the external network herein. The user devices are communicated to each other by the wireless network such as Bluetooth and WiFi, which is referred to as the internal network herein. Other coordinated communications may be used to increase the transmission speed when the external network of the user device cannot meet the applications due to the network speed.

Figure 4:
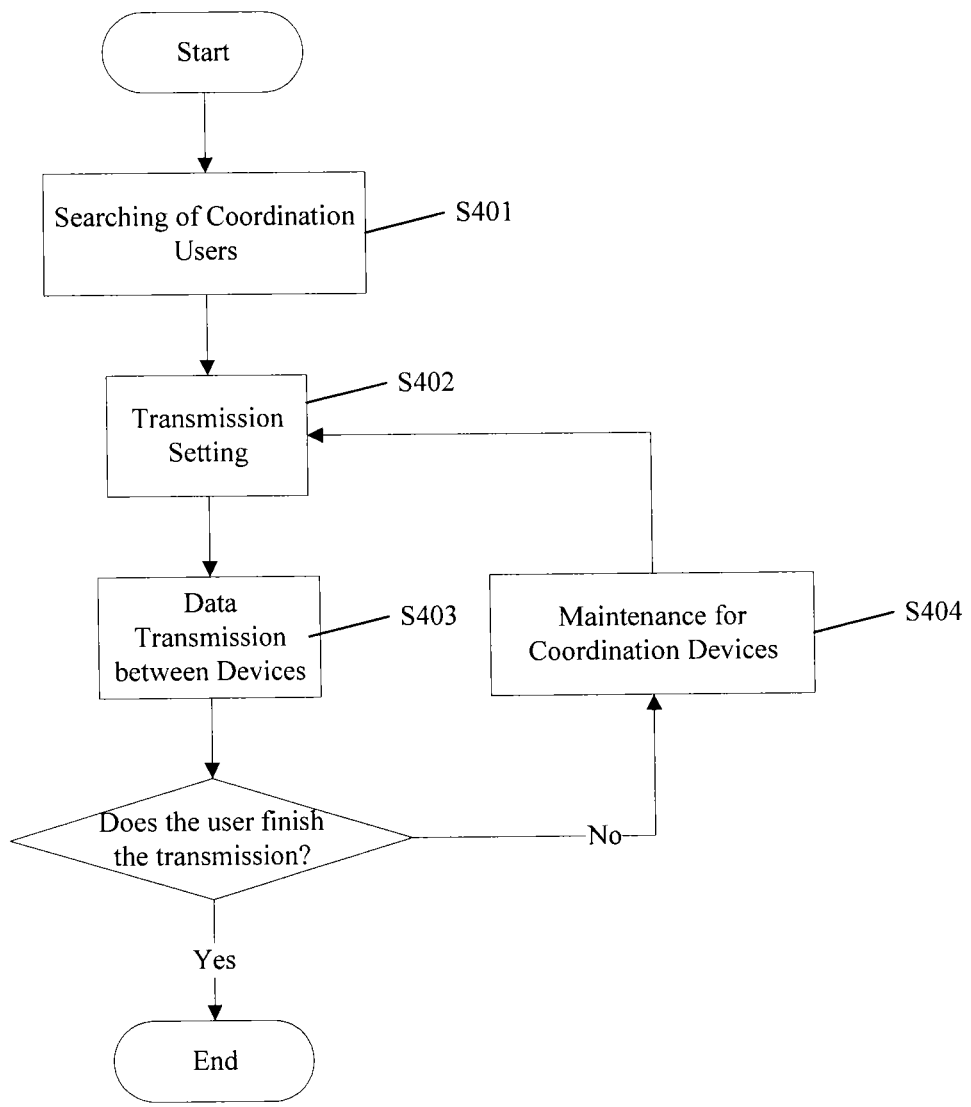
FIG. 4 is a brief flowchart of a coordinated transmission implementation method according to the present invention.

As shown in FIG. 4, the following steps are included for implementing the coordinated transmission: searching the coordination users at step S401.

Hypothetically, the device required to increase its network speed is referred to as the source device herein, and other devices involved in the coordinated transmission are referred to as the coordination devices. The source device searches the coordination users by the following three manners.

Manner 1 (Coordination Management Device Provided at the Network Side)

Figure 5:
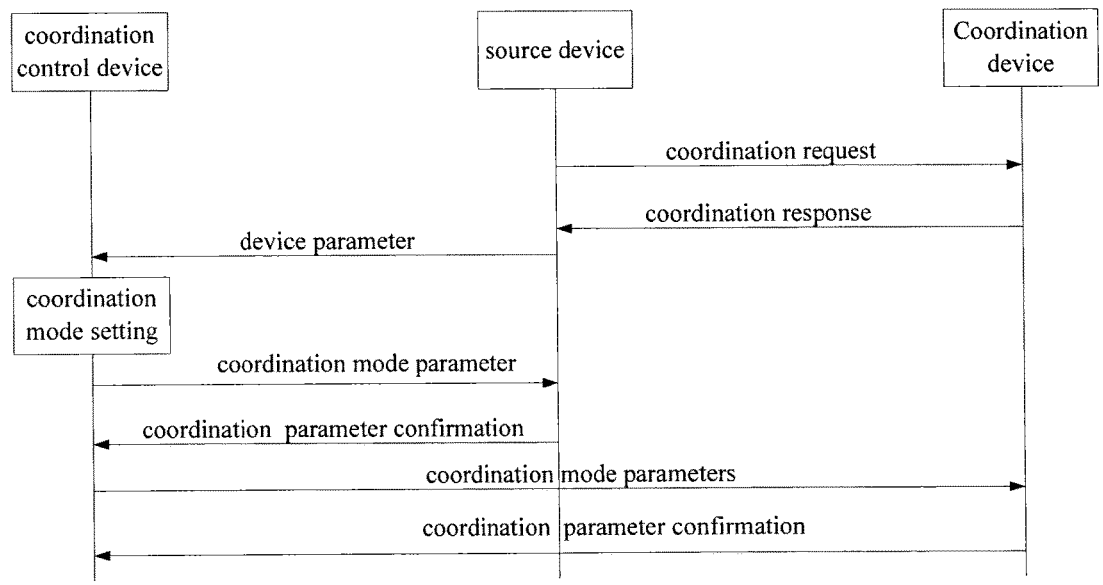
FIG. 5 is a flowchart of signaling in the mode 1 searched by a coordination user in a coordinated transmission implementation solution according to the present invention.

As shown in FIG. 5, the source device sends a coordination request, for example, sending beacon by WiFi or Bluetooth and other communication equipment. For example, the request may comprise the amount of services, the content of services to be downloaded and the like. The coordination devices (the coordination devices are suspended and thus actually belong to the candidate coordination devices) receive the coordination request, and then screen preliminarily in accordance with their information such as the geographic positions, the remaining traffics and the like. The devices meeting the basic requirements can send a response signal of the coordination request to the source device, the response signal sent by the coordination devices may be referred to as a coordination response including parameters such as the geographic positions of the coordination devices, the motion range, the channel quality of the external network (for example, bandwidth, signal strength and the like), the remaining traffics, the electric quantity and the like. The source device sends the information (including information carried by the coordination response of each coordination device) on all of the devices to the coordination control device. The coordination control device sets transmission parameters (including allocations for the amount of services and transmission resources to be downloaded allocated by each device in the coordinated transmission) in accordance with the information of each device, such as the geographic positions, the channel quality of the external network, the remaining traffics, the electric quantity and other parameters, and sends the transmission parameters to each device. The device sends a feedback to the coordination control device after receiving the transmission parameters for confirmation.

Manner 2 (Coordination Management Device Provided at the Network Side)

Figure 6:
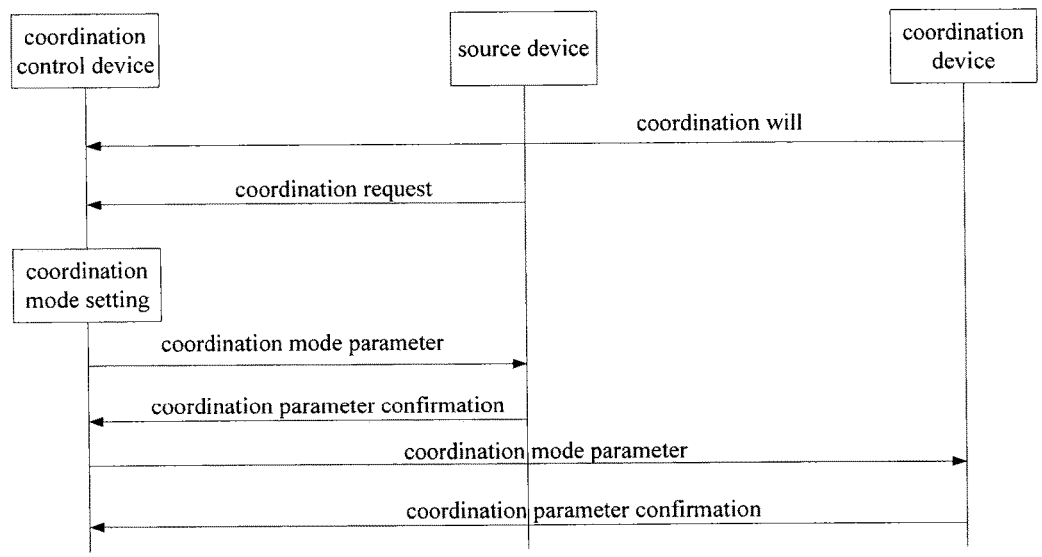
FIG. 6 is a flowchart of signaling in the mode 2 searched by a coordination user in a coordinated transmission implementation solution according to the present invention.

As shown in FIG. 6, the coordination device sends a desire on involving in the coordinated communication to the coordination control device in advance. The source device sends a coordinated communication request to the coordination control device as necessary. The coordination control device selects a coordination device for the source device depending on the position of the source device and sets the transmission parameters. Then, the coordination control device sends the transmission parameters to the devices including the source device and the coordination device. In such manner different from the manner 1, the user device sends the beacon and scans all the possible frequency bands to obtain the beacon. The searching for the devices to each and the utilization of the frequency spectrums of the internal network are set by the coordination management device at the network side.

Manner 3 (Coordination Management Device Provided at the Source Device)

Figure 7:
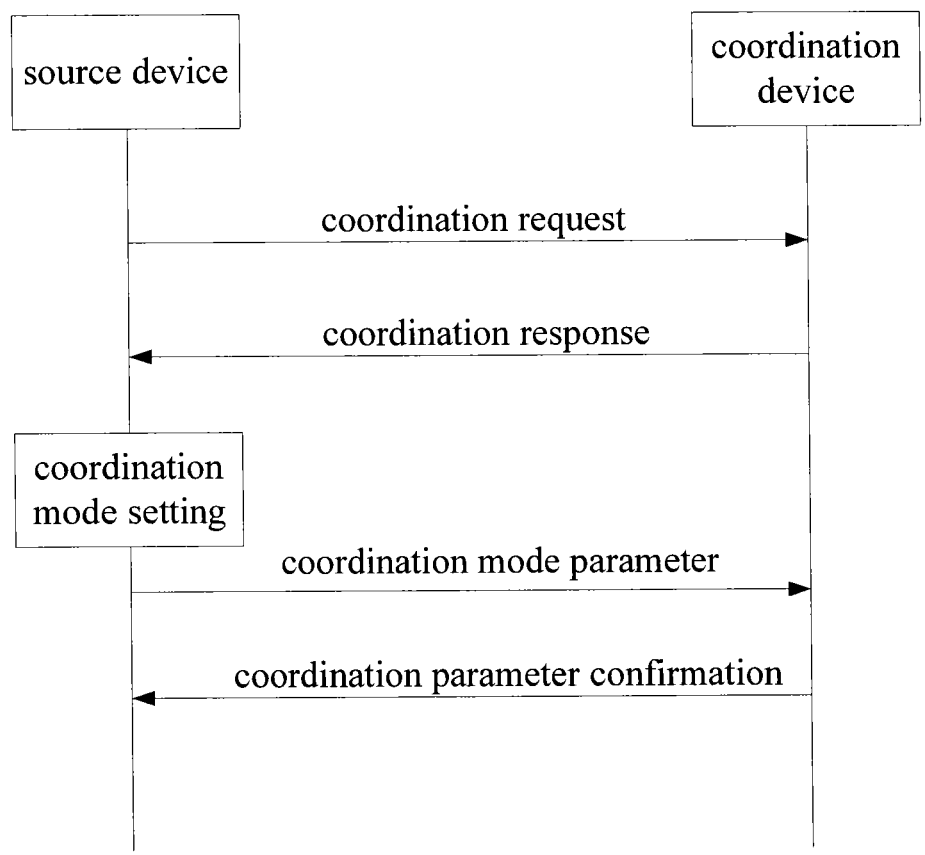
FIG. 7 is a flowchart of signaling in the mode 3 searched by a coordination user in a coordinated transmission implementation solution according to the present invention.

As shown in FIG. 7, the source device sends a coordination request beacon. The coordination device sends a response signal of the coordination request to the source device after receiving the coordination request. The source device sets transmission parameters in accordance with parameters of the coordination device and parameters of the source device. Then, the transmission parameters are sent to the responded coordination device.

In the above manners, a coordination enabled device of the device may provide the motion range and the movement speed of the device so that the coordination control device selects a proper coordination device, wherein the movement speed may be concluded from the historical movement information of the enabled device of the device for the past time.

In addition, by the manners 2 and 3, after receiving the transmission parameters, the coordination device may further send a confirmation message to the coordination control device so as to confirm that the coordination device agrees the coordinated transmission in accordance with the received coordination parameters. The coordination control device will know the coordination device agrees the coordinated transmission after receiving the confirmation message of the coordination device.

Manner 4 (Coordination Management Device Provided at the Source Device)

The source device initiates the coordination with one or a plurality of designated coordination devices. For example, the source device and the coordination device may target the coordination device by many manners such as NFC and the like and establish connections with them without sending the beacon. Thus, the source device may allocate a task to the coordination device directly with the aid of the coordination control device, and the source device directly determines the task quantity for each coordination device.

The manners 1-4 described may be applicable to both downloading and uploading the target data.

Some of the information may be omitted when the target data is to be uploaded so as to reduce the signaling overheads. Specifically, the coordination device can be searched in conjunction with the following manners.

Manner A

When the device equipment has the data to be uploaded (for example, the data is required to send to a network hard disk, actually, the network equipment receiving the data uploaded may be, but not limited to the network hard disk, other servers or network equipment), because the device is low in its network connection speed or is connectionless, the device equipment may search adjacent equipment having a storage function and providing network connection at the moment or a certain time in the future, which is referred to as the auxiliary equipment (i.e. the above candidate coordination device). The searching may be achieved by broadcast signaling (beacon).

The device equipment (source device) may regularly send a distribution and transmission device request signaling, and the user can determine a selection condition of the auxiliary device in advance depending on the application and send the distribution and transmission device request signaling carrying the selection conditions to other devices. For the selection conditions, the user sets the network speed of the auxiliary device to be more than 1 Mbits/S, and if the auxiliary device fails to provide the network immediately, it will provide the network within 30 min depending on the history. According to the conditions, a distribution and transmission control device on the adjacent device equipment judges whether the auxiliary device meets conditions involving in the distribution and transmission set by the user according to the history of the network connection.

If the adjacent auxiliary device equipment receiving the request message meets the conditions set by the user, the auxiliary device equipment sends a corresponding feedback signaling, wherein the feedback may comprise, but not limited to, at least one of memory capacity of the auxiliary device equipment and the statistical information of network connection.

Manner B

When the device has the data to be sent to the network hard disk, a broadcast signaling informs the adjacent equipment of reading the data of the user equipment.

As further shown in FIG. 4, the transmission setting is performed at step S402 after the coordination users are searched.

The transmission parameters are set by the coordination control device which may be provided at the public network side or installed at the device. The coordination control device sets some services transmitted by the coordination user in services of the source device in accordance with the external network of the source device and the coordination device and the internal network resource. In addition, the transmission setting includes a plurality of settings that the coordination user communicates with other devices through the internal network after the completion of the transmission, such as, route selection, transmission time (timing sequence for transmission of each device).

As shown in FIG. 8, the timing sequence of each device may be divided into coordination user group setting period T0, external device network transmission period T1 and internal device network transmission period T2. A setting result is sent to the coordination enabled device of each device by the coordination control device. The setting of the timing sequence for the transmission will be described in conjunction with the scenes.

Scene 1: Single-Mode Transmission Device

Hypothetically the device fails to transmit the data through the external and internal networks simultaneously at any time, thus, the device is arranged with reference to the timing sequence in FIG. 9 to transmit the data through the external network and the internal network so that the overall transmission time is shortest, thereby achieving the fast network transmission of the source device. For example, when the coordination device 1 and the source device transmit the data through the internal network, other coordination device may transmit the data through the external network, thereby reducing the idle time of the device.

Figure 10:
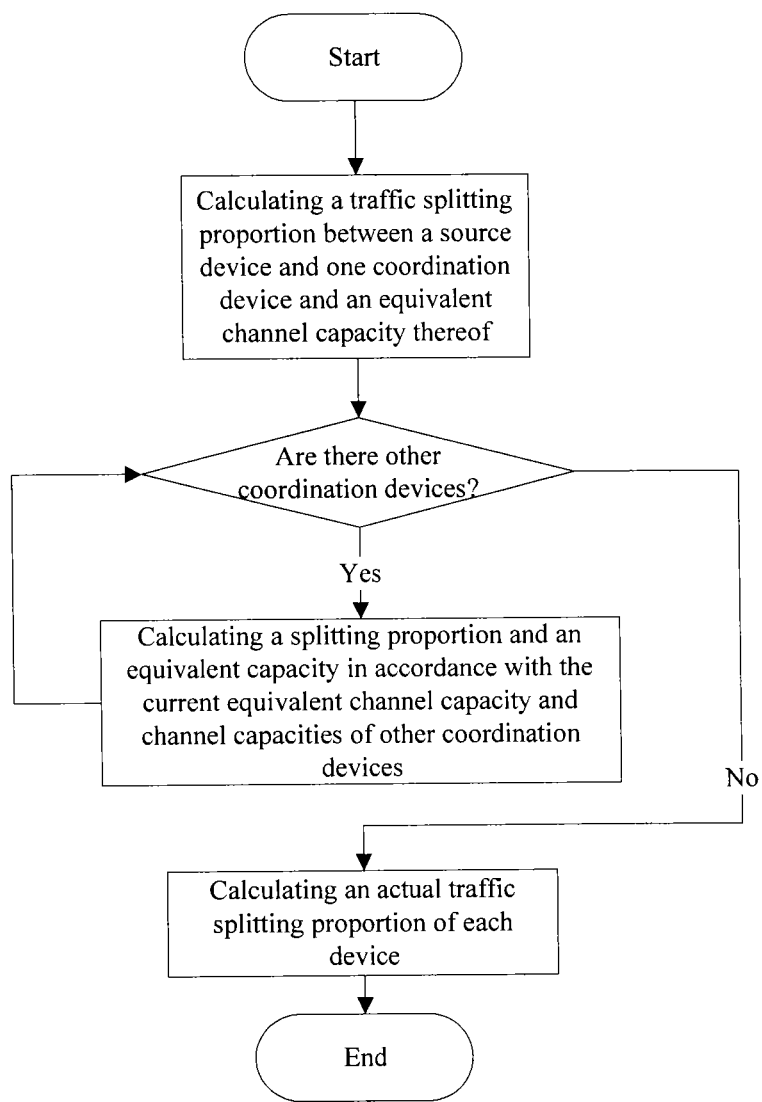
FIG. 10 is a flowchart of determining a task splitting proportion in a coordinated transmission implementation solution according to the present invention.

Thus, a procedure for calculating a service splitting proportion is shown in FIG. 10 for the service splitting.

As shown in FIG. 10, a traffic splitting proportion and equivalent channel capacities for the source device and one coordination device may be calculated at first. If there is no other coordination device, an actual traffic splitting proportion for each device may be calculated. If there is another coordination device A, a splitting proportion is calculated in accordance with the current equivalent channel capacity and the channel capacity of the coordination device A, and the current equivalent channel capacity is updated, so that if there is another coordination device B, a splitting proportion is calculated by using the updated equivalent channel capacity until all the coordination devices are considered.

Figure 11:
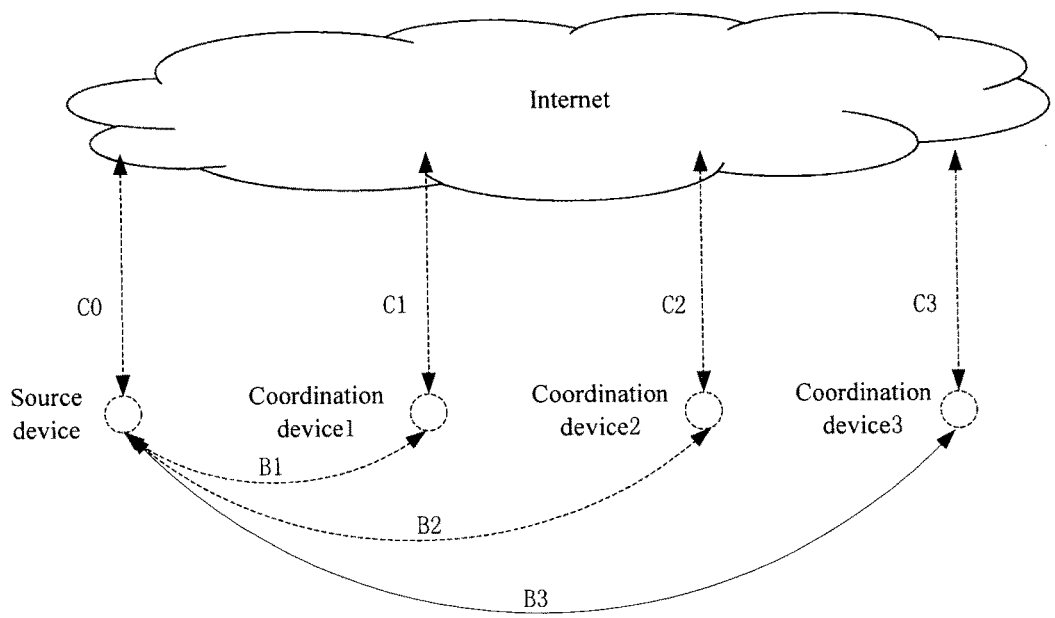
FIG. 11 is a diagram showing data transmission among four devices in a coordinated transmission implementing solution according to the present invention.

FIG. 11 illustrates examples of four devices involved in the coordinated transmission. As shown in FIG. 11, channel capacities between the devices and the internet are C0, C1, C2 and C3, respectively. The local communication channel capacities among the devices are B1, B2 and B3, respectively. It is assumed that the source device and the coordination device 1 distribute the data with the length L, the source device and the coordination device 1 implement the communication through the external network simultaneously so as to perform communication through internal network. It can be determined that the data distribution proportion between the source device and the coordination device 1 is C0:C1, that is, the source device has LC0/(C0+C1) in a transmission length and the coordination device 1 has LC1/(C0+C1) in a transmission length, both with a simultaneous transmission time being L/(C0+C1). A transmission time between the source device and the coordination device 1 is LC1/B1(C0+C1). If x0=C0/(C0+C1), x1=C0/(C0+C1). The equivalent channel capacities of the coordinated transmission between the source device and the coordination device 1 are obtained by dividing the service to be transmitted for the source device by the sum of the simultaneous transmission time and the internal transmission time between the source device and the coordination device, i.e.

$$C1' = \frac{L}{\frac{X1L}{C1} + \frac{X1L}{B1}} = \frac{B1(C0 + C1)}{B1 + C1}$$

The splitting proportion C1':C2 can be determined by the equivalent channel capacity C1' of the source device and the channel capacity of the coordination device 2. As such, the equivalent channel capacity C2' and the splitting proportions x1' and x2' can be calculated when the distribution transmission is performed through the equivalent channel of the coordination device 2 with the source device and the coordination device 1. The step is repeated until all the devices involved in the coordinated transmission are considered, thereby obtaining x2' and the splitting proportion x3 of the coordination device 3. The actual splitting proportion of the coordination device 2 is x2'(1−x1'). The actual splitting proportion of the coordination device 1 is x2'x1'(1−x0). The service splitting proportion of the source device is x2'x1'x0.

Scene 2: Multi-Mode Transmission Device

The multi-band simultaneous transmission is available for the device, which means the source device may transmit the data with other coordination device through the internal network at the same time of data transmission through the external network. Thus, the effective transmission speed of the coordination device #i is Ci'=min(Ci, Bi).

The equivalent speed of the coordinated transmission is C0+C1'+ . . . . The service splitting proportion of the coordinated transmission is $$Xi' = \frac{Ci'}{C0 + C1' + C2' + \cdots + CN'}$$

Wherein, N is the number of the coordination devices.

Preferably, the order is performed in accordance with the channel quality of the external network and the channel quality of the internal network for the coordination device or the coordination device is selected to be involved in the service splitting transmission. For example, in the calculation of the service splitting between the source device and the coordination device 1, the equivalent channel capacity for the coordinated transmission between the source device and the coordination device 1 is C1'=(C0+C1)B1/(B1+C1). It can thus be seen that the channel capacity obtained by aggregation of the two devices is C1'=(C0+C1) if B1 is much greater than C1. The coordinated transmission will generate no increment of the channel capacity of the source device if B1 is less than C0, and thus the transmission efficiency will not be improved.

Figure 12:
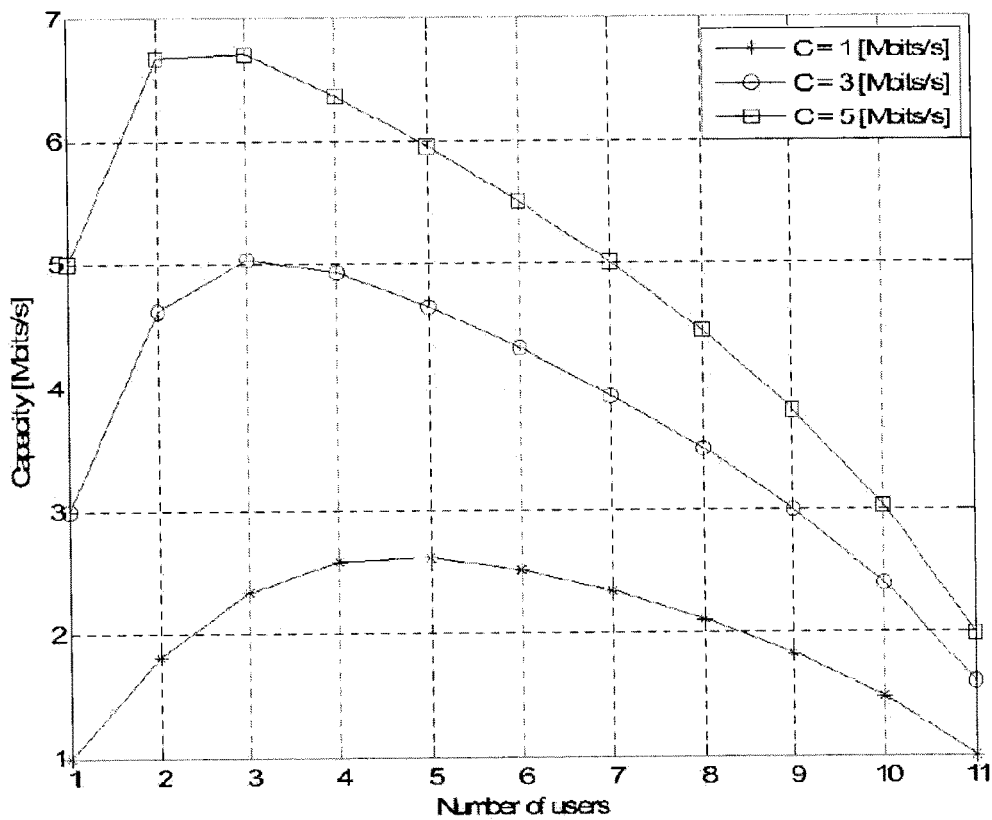
FIGS. 12-14 are curve charts showing channel capacity depending with the change of the number of the coordination users in different conditions.

It means that the capacities of the plurality of communication links used in the coordinated transmission are affected by the local network speed and the speed of the external network. The channel quality of the external network relies on a place where the user is located and the network quality provided by the operator. The channel capacity of the internal network depends on the number of the coordination devices, and the speed of the internal network of the coordination devices reduces as the number of the coordination devices increases. The external and speed of the internal networks are both took into account in the coordinated transmission for the single-mode transmission devices. For example, as shown in FIG. 12, the number of the coordination devices is increased to 10 from 1 and the speed of the internal network is reduced to 1 Mbits/s from 10 Mbits/s. The curve indicates the network speed achieved actually in the coordinated transmission when the external network is C=1, 3, 5 MBits/s. It can thus be seen that the network speed of the coordinated transmission does not always increase because the speed of the internal network reduces as the number of the coordination devices increases.

Therefore, keeping increasing the number of the coordination devices cannot ensure the continuous increment of the coordinated transmission speed. By analyzing the parameter setting in FIG. 12, when the speed of the external networks of the two devices are 5 Mbits/s, the efficiency of the coordinated transmission between the two devices can be maximized. If the speed of the external networks of the devices are different, the respective network speeds of the devices are ordered, thereby selecting some coordination devices from all of the coordination devices (for example, select one or a plurality of devices with the highest speed).

Figure 13:
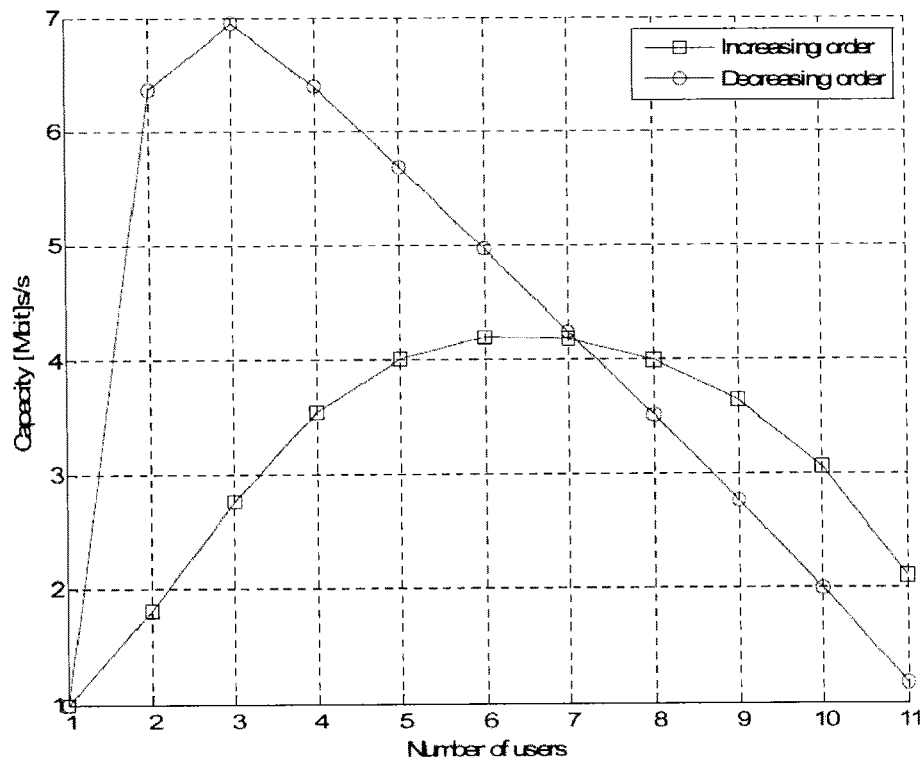

Additionally, as shown in FIG. 13, it is assumed that the speed of the external networks of 10 coordination devices are spaced equally from 1 Mbits/s to 5 bits/s, the coordination devices are ordered in the speed of the external network from high to low and the coordination device with the highest speed of the external network is selected. Thus, the higher coordinated transmission speed is achieved by cooperating with a smaller amount of coordination devices.

Figure 14:
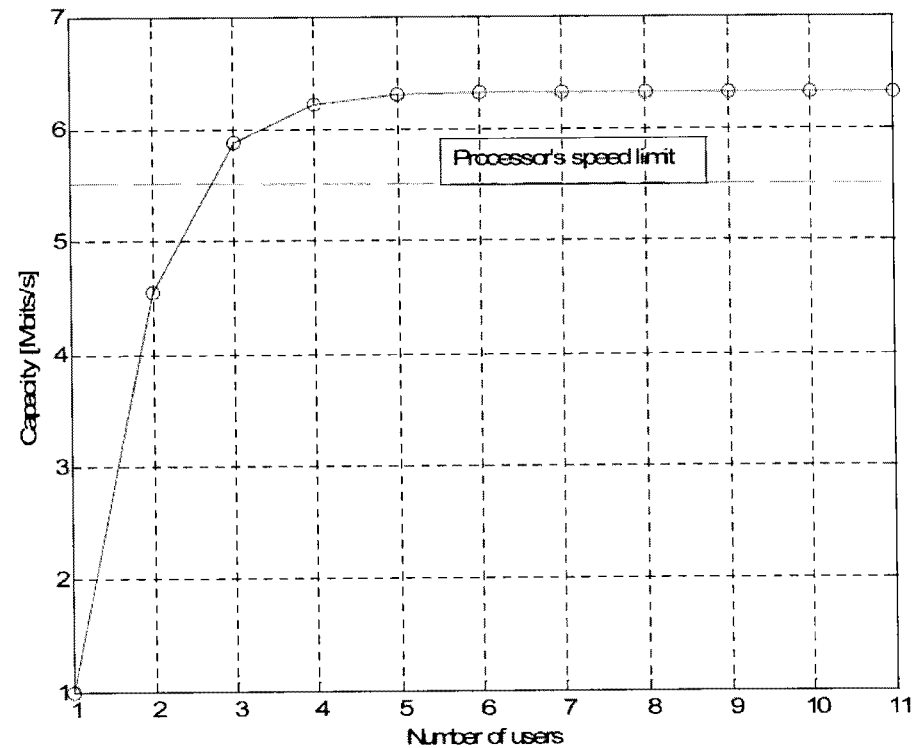

For the multi-band transmission, if the local transmission speed is less than that of the external network, the traffics of the external network cannot be used fully. If the speed of the internal network is high, the coordinated transmission speed increases as the number of the coordination devices increases. However, as shown in FIG. 14, the coordinated transmission speed will reach the upper limit of the processing speed of the equipment (for example, limited by the CPU speed, the bus inside the equipment, the cache speed and other factors). Therefore, the number of the coordination devices with the highest speed of the multi-band transmission devices can be determined in accordance with the upper limit of the speed of the equipment.

The effect of the coordinated transmission is affected by the stability of the coordination devices. Some coordination devices often leave a coordination group due to their position changes, which will result in frequent adjustment of the transmission parameters, thereby causing unstable coordinated transmission and further increasing the control overheads of the system.

After the determination of the transmission parameters, the coordination control device may check whether the remaining traffic of each coordination user meets the transmission requirement of the next data transmission time slot, and calculates the time for implementing the next data transmission time slot in accordance with the remaining electric quantity of the user. Finally, if remaining electric quantity for the coordinated transmission is too low, it will cause the coordination device to leave the coordination group in the coordinated transmission.

In a situation that the target data is uploaded, if the target data is required to upload in real time, the transmission parameters of each coordination device may be determined by the above manner. If the target data is not required to upload in real time, the information whether the multi-mode transmission is available for the coordination device and the source device and the data transmission timing sequences between the device and the device as well as the device and the network may be omitted. When the coordination device receives the target data from the source device, the factors to be considered include, but not limited to, the networking history of the coordination device (including networking time distribution, networking time length, networking frequency and the like) and the storage space provided by the coordination device.

The data transmission manners for uploading the data are given as follows.

Data Transmission Manner I

If the device searches the adjacent equipment in the manner A, the device equipment required to send the data partitions the data to be sent to the network hard disk in accordance with the number of the adjacent devices and the statistical network information of the devices after determination of the adjacent devices involved in the distribution and transmission. The data blocks are sized within the scope of the storage capacity of the distribution and transmission device in accordance with the network. For example, if the distribution of one device at the network disconnection time T_OFF is f_T-OFF(x), the distribution of the device at the network connection time T_ON is f_T-ON(x), and the network speed distribution B at the network connection is f_B(x), the statistically average network speed of the device can be calculated by the following equation:

$$\overline{B} = \int_0^\infty \frac{zx}{(x+y)} f_{T_{ON}}(x) f_{T_{OFF}}(y) f_B(z) \, dx \, dy \, dz$$

Thus, the sizes of the data blocks can be calculated in proportion based on the statistically average network speed of each device.

The source device sends the address of the user's network hard disk and the ID of the data block (for data recombination) at the same time of transmitting the data block, so that the control device at the network side recovers the original data of the source device in accordance with the ID of the data block (i.e. recover the target data).

The device receives a confirmation message (used for representing whether the data block transmitted to the coordination device currently is successful) from the adjacent device after sending the data block to the adjacent device involved in the distribution and transmission. If the confirmation message represents the data block has been sent successfully, the source device may delete the data to provide idle storage space for other applications.

Data Transmission Manner II

If the source device searches the adjacent equipment (the coordination device) in the manner B, the adjacent equipment actively reads the user data (including the data block, the ID of the data block and the address of the user's network hard disk) after receiving the signaling. After the adjacent equipment reads a piece of data successfully, it sends a message to the user equipment to inform it of cleaning up the data block read successfully, so that the control device of the source device can ensure that the data block will not be read repeatedly by the different adjacent equipment.

Based on the manners I and II, the adjacent equipment sends the user data to the designated user's network hard disk and deletes the data after it is sent successfully once it is networked after receiving the data.

Preferably, the user device may increase the probability that the data is read and written to the network hard disk correctly, thereby avoiding the data not be stored being deleted.

Improvement Manner I

In the above steps, the user device sends the same data (for example, the data blocks having the same ID and content) to a plurality of adjacent device equipment simultaneously. After neighboring equipment correctly uploads the data to the network hard disk successfully, when other adjacent equipment upload the same data again, the network hard disk will inform the adjacent equipment of existence of the data to be uploaded at the network side, so that the data can be deleted locally from the equipment.

Improvement Manner II

In the above steps, the user device sends the data to the adjacent equipment and then deletes it, and however, if the adjacent equipment fails to upload the data to the network side, the data will be lost, thereby resulting in no recombination of the target data. In order to avoid the data which is not sent to the network hard disk by the adjacent devices from being deleted by the user device, the user device executes the following procedures prior to deletion of the data.

The source device sends the ID of the data block and an ID of a coordination device successfully receiving the ID of the data block to the network hard disk, and the source device does not delete the data stored locally by it after sending the data to the adjacent equipment. In a situation that the adjacent equipment uploads the data corresponding to the ID, if the ID for uploading the data block matches with the ID of the adjacent equipment which is uploading the data currently, the data the adjacent equipment uploads will be received. When the adjacent device equipment sends the data to the network hard disk successfully, the network hard disk sends a message (including the ID of the data block, and successful storage of the data block corresponding to the ID) to the source device for informing it of deleting the data from the source device locally.

Besides, in the embodiments in which the data is uploaded, to strengthen the safety of the data transmission, the user device sends the data to the adjacent device and then acquires the ID of the neighboring equipment as well as gives limited hard disk accessibility (so that the adjacent device can write the data in the network hard disk merely but not read the data from the network hard disk). Then, the user device sends the ID of the data block and the ID corresponding to the adjacent device to the network hard disk when it is networked. In a situation that the adjacent device accesses the network hard disk, the adjacent device can write the data into the network hard disk with the use of the correct ID of the device and the ID of the data block.

Additionally, the adjacent equipment is merely used to assist the source device in storing the data instead of uploading the data to the network side. For example, if the equipment in proximity to the source device is user equipment, such as a hard disk carried by the user, a laptop, a TV and even a refrigerator, etc., the user data can be stored in the hard disks of the devices instead of transmitting the data to the network hard disk. The user data is split in accordance with the proportion of the memory capacity of the adjacent equipment or split equally. The user may read the data stored in the adjacent equipment according to the ID of the data block and an ID of corresponding to the adjacent equipment storing the data.

Figure 15:
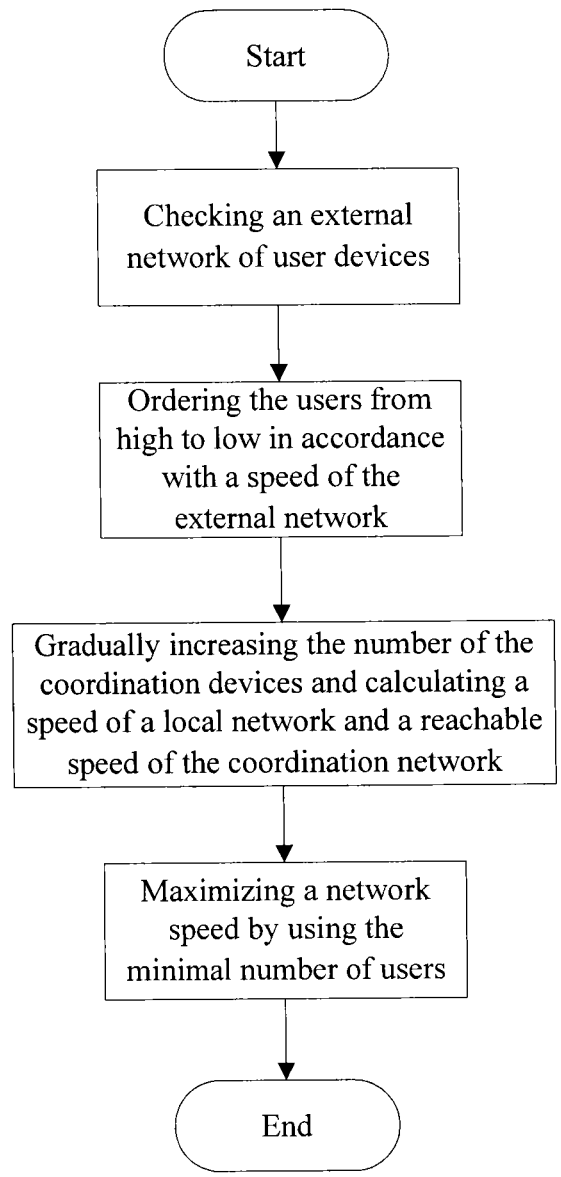
FIG. 15 is a flowchart showing selection of a coordination device in a coordinated transmission solution according to the present invention.

In addition, to avoid the coordination group changing as the device changes, the procedure for selecting the coordination device includes the following steps in junction with FIG. 15: inspecting the external network of the device: a speed of a local network is generally greater than the speed of the external network. However, in a special situation, when the speed of the local network is less than that of the external network, the coordinated transmission will cause the lower network speed, and thus inspecting the speed of the external network can avoid the low efficiency caused by the coordinated transmission; ordering the devices in accordance with the speed of the external network for example, from high to low; gradually increasing the number of the coordination devices and calculating the speed of the local network and a reachable speed of the coordination network; and maximizing the network speed using the minimal number of the devices in accordance with a calculation result.

As for the selection of the coordination device, the device with the high speed of the external network is selected preferably, and the device with slight position change and/or slow movement speed may be selected preferably, and the device with high available electric quantity/traffic is also selected preferably.

Data Transmission Between Devices

After the transmission parameters are set, the data transmission between the devices includes the transmission between the devices through the external network and the data transmission between the devices through the internal network. In a situation that the data is downloaded, after the transmission ends, the source device merges the service data received in accordance with the splitting proportion (for example, merging may be achieved in the coordination control device provided at the source device). In a situation that the data is uploaded, the network side merges the data from the coordination device. If the source device finishes the data transmission of the application (for example, the source device finishes the downloading, or the source device has transmitted the data to be uploaded to the coordination device), the coordinated communication ends. Preferably, the coordination control device may determine the transmission quality of the local network in the coordinated transmission, and the coordination control device may also dynamically adjust the transmission parameters in accordance with the possible change of the real-time channel capacity of each device within the next transmission parameter period, thereby further optimizing the process of the coordinated transmission and improving the efficiency.

Maintenance for Coordination Device Group

Figure 16:
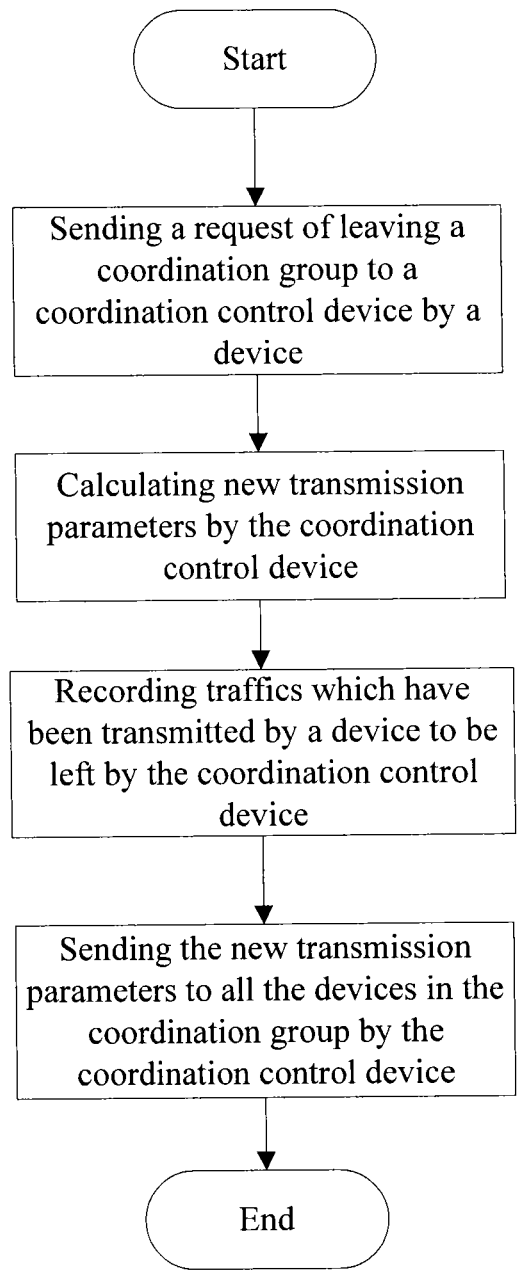
FIG. 16 is a processing flowchart of a coordination device leaving a coordination group in a coordinated transmission implementation solution according to the present invention.

During the coordinated transmission, if the transmission fails, maintenance for the coordination device group at the next time slot is needed, for example, to determine which devices may continue the coordinated transmission and which devices leave the coordination device group. FIG. 16 is a procedure showing the coordination device leaves the coordinated transmission mode, and the coordination device may send a leaving request during the transmission and may also send a leaving request at any time.

Refer to FIG. 16, the procedure that the coordination device leave the coordination group includes the steps of: sending a request of leaving the coordination group to the coordination control device by a device; calculating new transmission parameters by the coordination control device; recording, by the coordination control device, the traffic has been transmitted by the device to be left; and sending new transmission parameters to all of the devices in the coordination group by the coordination control device.

In addition, the maintenance for the coordination device group also functions to determine transmission traffics, provided for the source device by each coordination device, calculated by a network management device during the transmission of the source device with the aid of each coordination device, and the coordination device may charge the fees to the source device in accordance with the traffic provided. The source device utilizes the traffics of the coordination device to increase its transmission speed, and pays for the coordination device in accordance with the utilization of the traffics. The fee may be the actual fee specified by the traffic price of the operator and may be also the virtual money set proportionally in accordance with the traffics. The coordination control device provides a frequency spectrum trading platform for the devices by managing the frequency spectrum of each device. For example, one device purchases 300M in the traffic from the operator, which, however, is not used up at a traffic settlement date, so that the device may sell the remaining traffic to a device required to increase the transmission speed by the coordinated transmission.

If the user device acquires the virtual money by providing the coordinated transmission for other devices, it can purchase the traffic from the coordination device by spending the virtual money at a requirement for improving the network speed of the user device. As such, each device will provide the coordinated transmission for other devices positively when the higher network speed is not needed so as to acquire the coordination from other devices at a requirement for improving the network speed.

Furthermore, in order to realize the traffic trade, a random traffic settlement data may be set for each device instead of setting the last day of each month as the traffic settlement date for all of the devices. As such, the user may settle the traffic every day so as to increase the probability that the device sells out the remaining traffic through the coordinated transmission every day, thereby increasing the potential number of the coordination devices. The server may randomly and evenly distribute the traffic settlement date for the users. The server may calculate the traffics of the different users managed by the virtual operator in accordance with the traffic settlement date of the actual operator.

The problem that it is hard to improve the speed through the external network during the data transmission is solved by the solutions of the present invention. For example, when a plurality of users want to transmit a video in countryside in the prior art, each user cannot transmit the video separately. However, by the solution of the present invention, the coordinated transmission by other devices can significantly improve the data transmission speed of the device. For example, when some of the users waiting for the bus would like to browse the video but some do not use the network, the devices for providing the coordinated transmission can offer the traffics, thereby improving the network speed of the users to browse the video.

Furthermore, for uploading the data, many taxies in each city may be mobile public hotspots, that is, each user can connect to the public hotspot within the hotspot service without a password. Theses taxies provide data storage for the neighboring users. Then, the taxies utilize the neighboring high-speed networks such as 802.11ad and transferjet at different gas stations and taxi waiting areas in the city to rapidly send the user data block to the designated network hard disk. Besides, the coordination device assisting the source device in uploading the data may be, but not limited to the taxi, the bus, the library and other location or facility covered by the hotspot.

According to the embodiments of the present invention a method for implementing the coordinated transmission between the electronic devices is provided, which is used in the coordination of other devices.

Figure 17:
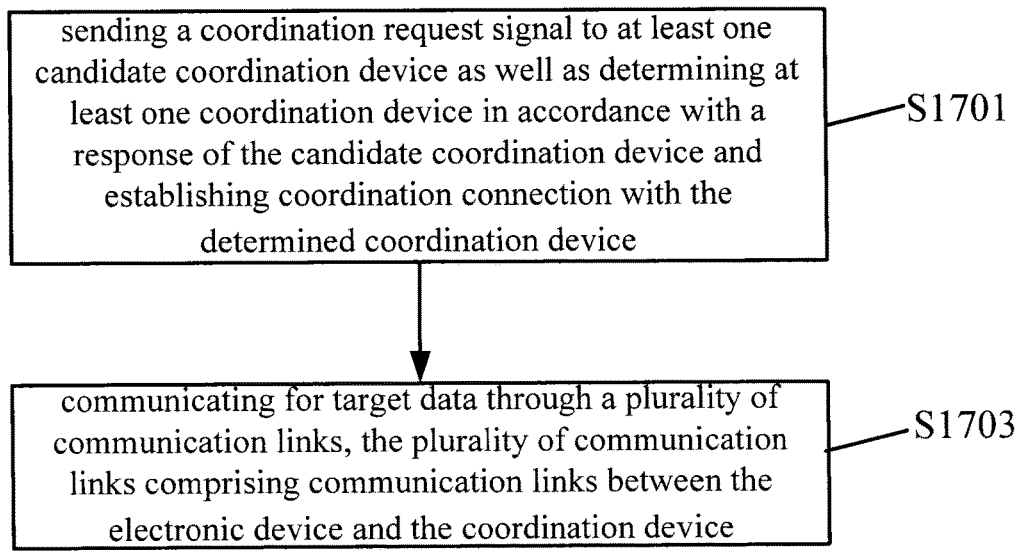
FIG. 17 is a processing flowchart showing a device request other device to implement coordinated transmission according to the present invention.

As shown in FIG. 17, the method comprises the following steps: sending a coordination request signal to at least one candidate coordination device as well as determining at least one coordination device in accordance with a response of the candidate coordination device and establishing coordination connection with the determined coordination device at step S1701; and communicating for target data through a plurality of communication links, the plurality of communication links comprising communication links between the electronic device and the coordination device at step S1703, wherein the plurality of communication links include communication links between the electronic device and the coordination devices.

On the one hand, when the target data is downloaded, the data received through the plurality of communication links is merged to obtain the target data. On the other hand, when the target data is uploaded, the network side merges the data uploaded through the plurality of communication links to obtain the target data.

According to the embodiments of the present invention, a method for implementing the coordinated transmission between electronic devices is provided, which is used for providing the coordinated transmission for the device initiating a coordination request when other devices request the coordination.

Figure 18:
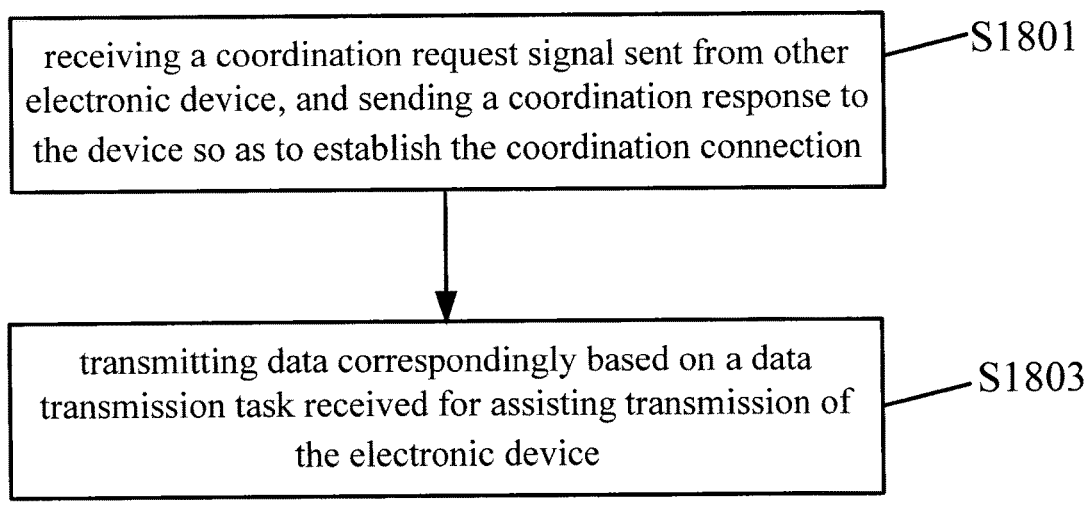
FIG. 18 is a processing flowchart showing a device request other device to implement coordinated transmission according to the present invention.

FIG. 18 shows the method comprising: receiving a coordination request signal sent from other electronic device, and sending a coordination response to the device so as to establish the coordination connection at step S1801; and transmitting data correspondingly based on a data transmission task received for assisting transmission of the electronic device at step S1803.

According to the embodiments of the present invention, a method for implementing the coordinated transmission is provided, which is used for implementing the coordinated transmission between the electronic devices with the aid of a coordination control device installed at the network side.

Figure 19:
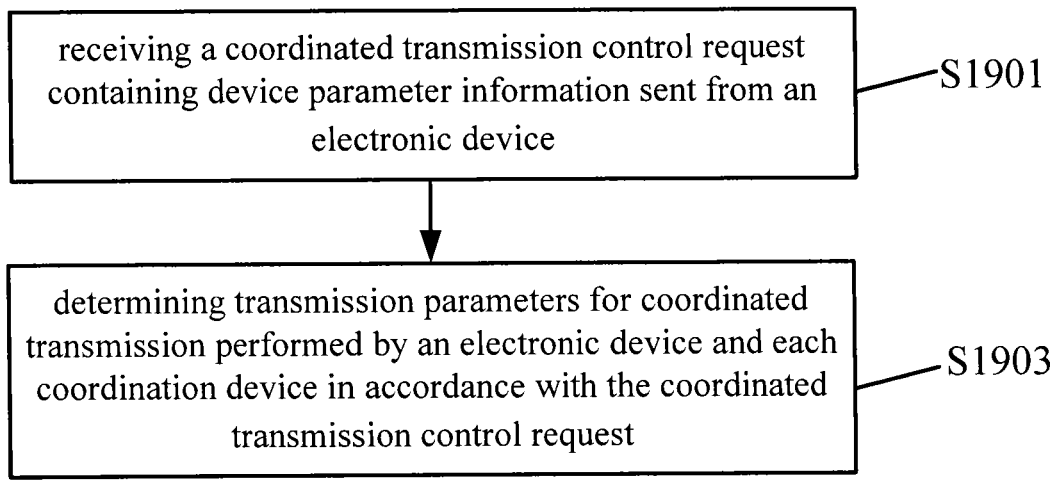
FIG. 19 is a flowchart of a coordinated transmission implementation method according to the present invention.

FIG. 19 shows the method comprising: receiving a coordinated transmission control request containing device parameter information sent from an electronic device at step 1901; and determining transmission parameters for coordinated transmission performed by an electronic device and each coordination device in accordance with the coordinated transmission control request at step 1903.

In conclusion, the present invention can establish the coordination connection reasonably by initiating the coordination through the request and transmitting the data through the plurality of communication links by the coordination device, thereby effectively improving the data transmission speed through the plurality of the communication links.

The basic principle of the invention is discussed with respect to the embodiments, however, it is noted that those skilled in the art should appreciate from the invention all or any of the steps or features of the method and device of the invention and may implement the same in any calculating device (such as processor, storage medium, etc.) or calculating device network by hardware, firmware, software or the combination thereof by applying their basic programming skills.

Therefore, the invention may be implemented by running a program or one group of programs in any calculating device. The calculating device may be the publicly known device. The invention may be implemented by merely providing a program product containing program codes for realizing the method or device. In other words, such program product constitutes the invention, and a storage medium storing such program product also constitutes the invention. Obviously, the storage medium may be any storage medium which is well known or will be developed in the future.

According to one embodiment of the present invention, a storage medium (which may be a ROM, a RAM, a hard disk, a removable memory and the like) is provided into which a computer program for implementing coordinated transmission between the electronic devices is embedded. The computer program has code segments configured to execute the following steps: sending a coordination request signal to candidate coordination devices and determining a coordination device in accordance with responses of the candidate coordination devices and establishing the coordination connection with the coordination device determined; and transmitting target data through a plurality of communication links, wherein the plurality of communication links include communication links between the electronic device and the coordination device.

According to one embodiment of the present invention, a storage medium (which may be a ROM, a RAM, a hard disk, a removable memory and the like) is provided into which a computer program for implementing coordinated transmission between the electronic devices is embedded. The computer program has code segments configured to execute the following steps: receiving the coordination request signal sent from the electronic device, and sending a coordination response to the device to establish coordination connection; and transmitting the corresponding data in accordance with a data transmission task received for assisting the device in transmission.

According to one embodiment of the present invention, a storage medium (which may be a ROM, a RAM, a hard disk, a removable memory and the like) is provided into which a computer program for implementing coordinated transmission between the electronic devices is embedded. The computer program has code segments configured to execute the following steps: receiving a coordinated transmission control request containing device parameter information sent from the electronic device; and determining transmission parameters of the coordinated transmission between the electronic device and each coordination device in accordance with the coordinated transmission control request.

According to another embodiment of the present invention, a computer program is also provided, which has code segments configured to execute steps for implementing the coordinated transmission between the electronic devices: sending a coordination request signal to candidate coordination devices and determining a coordination device in accordance with responses of the candidate coordination devices and establishing coordination connection with the coordination device determined; and transmitting target data through a plurality of communication links, wherein the plurality of communication links include communication links between the electronic device and the coordination device.

According to another embodiment of the present invention, a computer program is also provided, which has code segments configured to execute steps for implementing the coordinated transmission between the electronic devices: receiving the coordination request signal sent from the electronic device, and sending a coordination response to the device to establish coordination connection; and transmitting the corresponding data in accordance with a data transmission task received for assisting the device in transmission.

According to another embodiment of the present invention, a computer program is also provided, which has code segments configured to execute steps for implementing the coordinated transmission between the electronic devices: receiving a coordinated transmission control request containing device parameter information sent from the electronic device; and determining transmission parameters of the coordinated transmission between the electronic device and each coordination device in accordance with the coordinated transmission control request.

Figure 20:
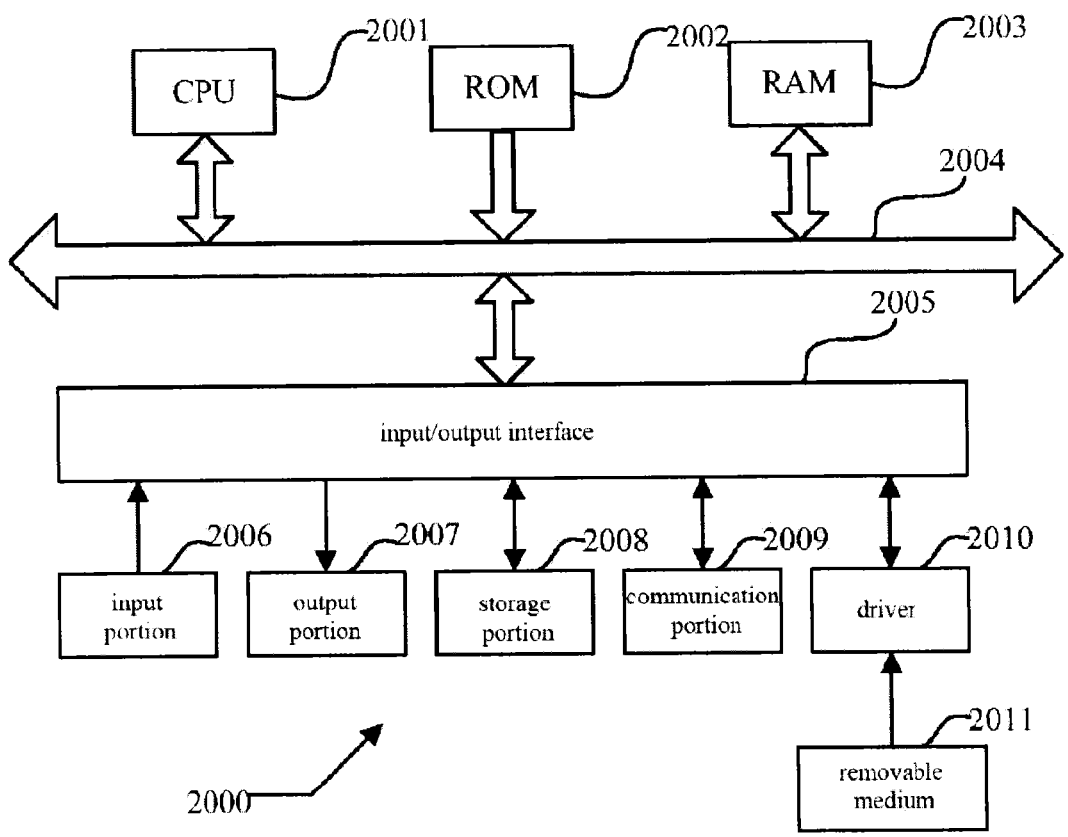
FIG. 20 is an illustrative structure diagram of a computer implementing the technical solution of the present invention.

In a circumstance that the embodiments of the invention are realized by software and/or firmware, program constituting the software are installed in a computer with a special hardware structure, for example, a general-purpose computer 2000 shown in FIG. 20, by the storage medium or network. The computer equipped with the program can run different functions.

Refer to FIG. 20, a central processing unit (CPU) 2001 executes different operations according to a program stored in a read-only memory (ROM) 2002 or program loaded in a random access memory (RAM) 2003 from a storage portion 2008. The RAM 2003 also stores data required for the different operations executed by the CPU 2001. The CPU 2001, the ROM 2002 and the RAM 2003 are connected mutually by a bus 2004. An input/output interface 2005 is also connected to the bus 2004.

An input portion 2006 including a keyboard, a mouse and the like, an output portion 2007 including a display (such as a cathode-ray tube (CRT) display, a liquid-crystal display (LCD) and the like) and a loudspeaker, etc., the storage portion 2008 including a hard disk, etc. and a communication portion 2009 including a network interface card such as an LAN card and a modulator-demodulator, etc. are connected to the input/output interface 2005. The communication portion 2009 runs a communication operation by a network such as Internet.

A driver 2010 is connected to the input/output interface 2005 as needed. A removable medium 2011 such as a disc, an optical disc, a magnetic optical disc, a semiconductor memory and the like are installed in the driver 2010 as needed, such that computer program read from the driver 2010 are installed in the storage portion 2008 as needed.

When the software is used to realize the processing operations, program constituting the software are installed by the network such as Internet or the storage medium such as the removable medium 2011.

Those skilled in the art should understand that the storage medium includes, but not limited to, the removable medium 2011 storing the program and providing program for users in separation from the device, shown in FIG. 20. The removable medium 2011 includes a disc (including a floppy disk (registered trademark)), an optical disc (including a compact disk read only memory (CD-ROM) and a digital video disk (DVD)), a magnetic optical disc (including minidisc (MD) (registered trademark)) and a semiconductor memory. Or the storage medium may be discs and the like included in the ROM 2002 and the storage portion 2008, wherein the discs stores program and are distributed to the users with the devices containing the same.

It is should be noted that the features or steps can be split and/or recombined in the device and method of the invention. Such splitting and/or recombination are deemed to be equivalent. Moreover, the steps can be performed in time order described naturally, but they are not necessarily required. Some steps can be performed in parallel or independently.

Although the invention and key points thereof have been described in detail, it should be understood that various changes, substitutions and alterations can be made herein without departing from the spirit and scope of the invention. Moreover, the terms, such as 'comprise', 'composed of' or other nonexclusive derivatives are used in the invention, such that the process, method, product or device comprises not only a series of factors but also other factors not described definitely, or inherent factors thereof. Without more limitations, the wording 'comprising one . . . ' defines one factor, but may comprise other same factors in the process, method, product or device.

The invention claimed is:

1. An electronic device, comprising:
processing circuitry programmed to:
send a coordination request signal to at least one candidate coordination device;
determine at least one coordination device in accordance with a response from the at least one candidate coordination device;
establish a coordination connection with the at least one determined coordination device;
communicate target data through a plurality of communication links, the plurality of communication links comprising communication links between the electronic device and the at least one determined coordination device;
send device parameter information to an external coordination control device;
receive a candidate coordination device instruction determined by the external coordination control device; and
send information of the at least one determined coordination device to the external coordination control device,
wherein the device parameter information includes a position of the electronic device and/or information of the target data.

2. The electronic device of claim 1, wherein the processing circuitry is programmed to:
merge data received by the plurality of communication links to facilitate a download of the target data, and/or
partition the target data to facilitate an upload of the target data through the plurality of the communication links.

3. The electronic device of claim 2, wherein
the device parameter information includes at least one of an external network rate for transmitting data between the electronic device and an external communication network including infrastructures, an internal network rate for transmitting data between the electronic device and the at least one determined coordination device, and mode information on whether multi-frequency simultaneous transmission is available,
the processing circuitry is programmed to receive transmission parameters from the external coordination control device and transmit data in accordance with the transmission parameters, and
the transmission parameters include transmission task information of the electronic device.

4. The electronic device of claim 2, wherein the processing circuitry is programmed to:
determine transmission parameters for coordinated transmission performed by the electronic device and each candidate coordination device,
inform a corresponding candidate coordination device of the transmission parameters which comprise transmission task information borne by the corresponding candidate coordination device.

5. The electronic device of claim 4, wherein the response from the at least one candidate coordination device comprises an external network rate for transmitting data between the at least one candidate coordination device and an external communication network including infrastructures.

6. The electronic device of claim 2, wherein a of the response from the at least one candidate coordination device comprises available memory space for the at least one candidate coordination device and/or an internal network speed for data transmission between the at least one candidate coordination device and the electronic device.

7. The electronic device of claim 6, wherein processing circuitry is programmed to partition the target data to be uploaded/downloaded in accordance with an internal network speed between the at least one determined coordination device and the electronic device and/or memory space of the at least one determined coordination device for data transmission.

8. The electronic device of claim 2, wherein
the processing circuitry is programmed to allocate transmission tasks to the at least one determined coordination device for a plurality of allocation operations, and
each allocation operation is carried out based on partial data in the target data not transmitted and ordered in front of other data.

9. The electronic device of claim 2, wherein the processing circuitry is programmed to:
a change of the at least one determined coordination device at a predetermined period;
re-determine a coordination device if the change of the at least one determined coordination device is detected; and
reallocate transmission tasks based on data in the target data not transmitted.

10. The electronic device of claim 1, wherein
data received through the plurality of communication links and partitioned data have identifications, and
the identifications are used to combine the data so as to obtain the target data.

11. The electronic device of claim 1, wherein the response from the at least one candidate coordination device further comprises at least one of mode information representing whether multi-frequency simultaneous transmission is available for the at least one candidate coordination device, a geographical location, a motion range, a motion speed, available electric quantity and available data traffic.

12. A coordination device, including:
processing circuitry programmed to:
receive the coordination request signal sent by the electronic device of claim 1;
send a coordinated response to the electronic device for establishing the coordination connection; and
transmit data based on a data transmission task received for assisting a transmission of the electronic device.

13. A method performed by an electronic device for implementing coordinated transmission between electronic devices, comprising:
sending a coordination request signal to at least one candidate coordination device;
determining at least one coordination device in accordance with a response from the at least one candidate coordination device;
establishing a coordination connection with the at least one determined coordination device;
communicating target data through a plurality of communication links, the plurality of communication links comprising communication links between the electronic device and the at least one determined coordination device;
sending device parameter information to an external coordination control device;
receiving a candidate coordination device instruction determined by the external coordination control device; and sending information of the at least one determined coordination device to the external coordination control device,
wherein the device parameter information includes a position of the electronic device and/or information of the target data.

14. A method performed by a coordination device for implementing coordinated transmission between electronic devices, comprising:
receiving the coordination request signal sent by the method of claim 13;
sending a coordinated response to the electronic device so as to establish the coordination connection; and
transmitting data based on a data transmission task received for assisting a transmission of the electronic device.

15. A coordination control device, including:
processing circuitry programmed to:
receive a coordinated transmission control request, containing the device parameter information, sent by the electronic device of claim 1; and
determine transmission parameters for coordinated transmission performed by the electronic device and each determined coordination device in accordance with the coordinated transmission control request.

16. The coordination control device of claim 15, wherein
the device parameter information includes a position of the electronic device and/or information of target data to be transmitted, and
the processing circuitry is programmed to:
determine a candidate coordination device in accordance with the device parameter information;
generate a candidate coordination device instruction in accordance with the determined candidate coordination device;
send an instruction of the determined candidate coordination device to the electronic device; and
receive the information of the at least one determined coordination device from the electronic device.

17. The coordination control device of claim 15, wherein
the device parameter information contains information on target data to be transmitted, external network rates for data transmission between the electronic device and the at least one determined coordination device and an external communication network including infrastructures, an internal network rate for data transmission between the electronic device and the at least one determined coordination device, and mode information on whether multi-frequency simultaneous transmission is available,
the processing circuitry is programmed to send transmission parameters to a corresponding candidate coordination device, and
the transmission parameters include transmission task information corresponding to the target data borne by the corresponding candidate coordination device for coordinated transmission.

18. The coordination control device of claim 17, wherein
the transmission parameters further comprise time sequences for coordinated transmission by each candidate coordination device through an external network and an internal network, respectively; and
the processing circuitry is programmed to determine a time sequence for each candidate coordination device for coordinated transmission in combination with whether multi-frequency simultaneous transmission is available for the electronic device and the candidate coordination device.

19. A coordination control method, comprising:

receiving a coordinated transmission control request, containing the device parameter information, sent by the electronic device of claim 13; and determining transmission parameters for coordinated transmission performed by the electronic device and each determined coordination device in accordance with the coordinated transmission control request.

* * * * *